US008816004B2

(12) United States Patent
Clapper et al.

(10) Patent No.: US 8,816,004 B2
(45) Date of Patent: Aug. 26, 2014

(54) OXAZOLINYL-CONTAINING POLYMERS AND GRAFTED COMPOUNDS PREPARED FROM THE OXAZOLINYL-CONTAINING POLYMERS

(75) Inventors: Jason D. Clapper, Lino Lakes, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/885,195

(22) PCT Filed: Dec. 7, 2011

(86) PCT No.: PCT/US2011/063726
§ 371 (c)(1),
(2), (4) Date: May 14, 2013

(87) PCT Pub. No.: WO2012/082487
PCT Pub. Date: Jun. 21, 2012

(65) Prior Publication Data
US 2013/0253137 A1    Sep. 26, 2013

Related U.S. Application Data

(60) Provisional application No. 61/422,743, filed on Dec. 14, 2010.

(51) Int. Cl.
| | | |
|---|---|---|
| *C08G 63/48* | (2006.01) | |
| *C08L 39/04* | (2006.01) | |
| *C08L 33/02* | (2006.01) | |
| *C08F 26/06* | (2006.01) | |
| *C08F 20/00* | (2006.01) | |
| *C08F 8/30* | (2006.01) | |
| *C08L 51/00* | (2006.01) | |
| *C08L 33/08* | (2006.01) | |
| *C08F 112/08* | (2006.01) | |
| *C08F 2/38* | (2006.01) | |
| *C08F 120/10* | (2006.01) | |
| *C08F 220/18* | (2006.01) | |
| *C08F 265/04* | (2006.01) | |
| *C08F 120/18* | (2006.01) | |
| *C08G 81/02* | (2006.01) | |
| *C08F 126/06* | (2006.01) | |
| *C08F 2/50* | (2006.01) | |
| *C09J 187/00* | (2006.01) | |
| *C08L 87/00* | (2006.01) | |
| *C08F 120/14* | (2006.01) | |
| *C08F 212/08* | (2006.01) | |
| *C08L 57/00* | (2006.01) | |
| *C08L 77/00* | (2006.01) | |

(52) U.S. Cl.
CPC .......... *C08F 265/04* (2013.01); *C08L 51/003* (2013.01); *C08L 33/08* (2013.01); *C08F 112/08* (2013.01); *C08F 2/38* (2013.01); *C08F 8/30* (2013.01); *C08F 120/10* (2013.01); *C08F 220/18* (2013.01); *C08F 120/18* (2013.01); *C08F 212/08* (2013.01); *C08G 81/021* (2013.01); *C08F 2810/40* (2013.01); *C08F 126/06* (2013.01); *C08L 57/00* (2013.01); *C08F 2/50* (2013.01); *C09J 187/005* (2013.01); *C08L 87/00* (2013.01); *C08L 77/00* (2013.01); *C08F 120/14* (2013.01); *C08F 2220/1858* (2013.01); *C08F 2800/20* (2013.01); *C08F 2438/02* (2013.01)
USPC .......... 525/66; 525/203; 525/221; 525/327.1; 525/329.5; 525/330.5

(58) Field of Classification Search
CPC ............ C08F 2/38; C08F 112/08; C08F 8/30; C08F 220/18; C08F 2/50; C08F 293/005; C08F 2220/1858; C08F 2438/02; C08G 81/021; C08L 87/00; C09L 187/005
USPC ........... 525/66, 203, 221, 327.1, 329.5, 330.5
See application file for complete search history.

(56) References Cited

U.S. PATENT DOCUMENTS

| 4,626,575 A | 12/1986 | Goel |
|---|---|---|
| 5,057,366 A | 10/1991 | Husman |
| 5,756,621 A | 5/1998 | Rösch |
| 5,804,610 A | 9/1998 | Hamer |

(Continued)

FOREIGN PATENT DOCUMENTS

| EP | 1548012 | 6/2005 |
|---|---|---|
| JP | 2000273319 | 10/2000 |

(Continued)

OTHER PUBLICATIONS

Baumert, "Carboxy-terminated homo- and copolymers of styrene using dicarboxylic acid-functional azo initiator and 2,2,6,6-tetramethyl-1-piperidyloxyl (TEMPO)", Macromolecular Rapid Communications, Sep. 1997, vol. 18, No. 9, pp. 787-794.

Dufils, "Intermolecular radical addition of alkoxyamines onto olefins: An easy access to advanced macromolecular architectures precursors", Polymer, Aug. 2007, vol. 48, No. 18, pp. 5219-5225.

Leenen, "Microwave-assisted nitroxide-mediated polymerization of alkyl acrylates", e-Polymers, 2005, vol. 71, pp. 1-9.

Mohammadpoor-Baltork, "A Novel and Chemoselective Synthesis of 2-Aryloxazolines and Bis-oxazolines Catalyzed by Bi(III) Salts", Synlett, Jul. 2005, vol. 18, pp. 2747-2750.

Takahashi, "An Efficient Oxidative Conversion of Aldehydes into 2-Substituted 2-Oxazolines Using 1,3-Diiodo-5,5-dimethylhydantoin", Synthesis, Feb. 5, 2009, pp. 2329-2332.

(Continued)

*Primary Examiner* — William Cheung
(74) *Attorney, Agent, or Firm* — Jean A. Lown

(57) ABSTRACT

Oxazolinyl-containing compounds having a single oxazolinyl group plus a first polymeric group are described. Grafted compounds are also described that are the product of a reaction of an oxazolinyl-containing compound with a second compound that has one or more acidic groups to form a grafted compound. In some embodiments, the second compound is a polymeric material having at least one acidic group and the reaction product is a grafted copolymer. Blended compositions of the grafted copolymer with a polyamide are also described.

20 Claims, No Drawings

(56) References Cited

U.S. PATENT DOCUMENTS

| | | |
|---|---|---|
| 5,986,011 A | 11/1999 | Ellis |
| 6,734,256 B1 | 5/2004 | Everaerts |
| 6,753,079 B2 | 6/2004 | Husemann |
| 6,869,678 B2 | 3/2005 | Yamanaka |
| 7,255,920 B2 | 8/2007 | Everaerts |
| 7,847,031 B2 | 12/2010 | Omeis |
| 2008/0207838 A1* | 8/2008 | Omeis et al. .................. 525/375 |
| 2010/0137524 A1 | 6/2010 | Grittner |

FOREIGN PATENT DOCUMENTS

| | | |
|---|---|---|
| JP | 2006124640 | 5/2006 |
| WO | WO 96-16999 | 6/1996 |
| WO | WO 96-34909 | 11/1996 |
| WO | WO 2012-005814 | 1/2012 |
| WO | WO 2012-082290 | 6/2012 |

OTHER PUBLICATIONS

International Search Report for PCT/US2011/063726, 4 pages.

* cited by examiner

OXAZOLINYL-CONTAINING POLYMERS AND GRAFTED COMPOUNDS PREPARED FROM THE OXAZOLINYL-CONTAINING POLYMERS

CROSS-REFERENCE TO RELATED APPLICATION

This application claims the benefit of U.S. Provisional Patent Application No. 61/422,743, filed Dec. 14, 2010, the disclosure of which is incorporated by reference herein in its entirety.

TECHNICAL FIELD

Oxazolinyl-containing polymers and grafted compounds formed from the oxazolinyl-containing polymers are described.

BACKGROUND

Bis-oxazoline compounds have been used as chemical crosslinking agents in various polymer systems. Such compounds are described, for example, in U.S. Pat. No. 6,869,678 (Yamanaka et al.), U.S. Pat. No. 6,753,079 (Husemann et al.), and U.S. Patent Application Publication No. 2010/0137524 (Grittner et al.).

Carboxyl-terminated polymers have been prepared. These are described, for example, in an article of Baumert et al. (*Macromol. Rapid Commun.*, 18, 787-794 (1997)).

Some oxazolinyl-containing polymers have been prepared. For example, WO 96/16999 (Emmerling et al.) describes the preparation of polyurethanes terminated with an oxazolinyl group and JP 2006/124640 (Takako et al.) describes an oxazolinyl-containing acrylic polymer that is crosslinked with a carboxylic acid-containing polymer.

Different methods have been used to reinforce various polymers such as acrylic polymers. For example, crosslinking the polymeric chains can impart greater shear strength and cohesive strength to the materials. This crosslinking can be chemical or physical. Chemical crosslinking can include the introduction of a monomer having at least two groups selected from a polymerizable group capable of undergoing a polymerization reaction and a functional group that are capable of reacting or interacting with other groups within the polymer. Physical crosslinking methods have included the introduction of another polymeric moiety that is linked to the main polymeric component but that has the ability to phase separate from the main polymeric component and form its own domain within the polymeric material. When the polymeric material is an adhesive material, these phase separated polymeric moieties can be selected to have a higher glass transition temperature than the primary viscoelastic polymer as described, for example, in U.S. Pat. No. 6,734,256 (Everaerts et al.), U.S. Pat. No. 7,255,920 (Everaerts et al.), and U.S. Pat. No. 5,057,366 (Husman et al.).

SUMMARY

Oxazolinyl-containing compounds having a single oxazolinyl group plus a first polymeric group are described. Grafted compounds are also described that are the product of a reaction of an oxazolinyl-containing compound with a second compound that has one or more acidic groups to form a grafted compound. In some embodiments, the second compound is a polymeric material (i.e., second polymeric material) having at least one acidic group and the reaction product is a grafted copolymer. Blended compositions of the grafted copolymer with a polyamide are also described.

In a first aspect, a compound is provided of Formula (I).

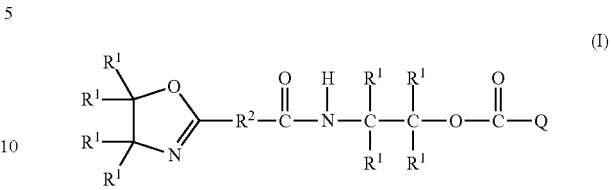

In Formula (I), each $R^1$ is independently hydrogen, alkyl, aryl, or aralkyl. The group $R^2$ is a single bond or a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl. Group Q is a polymeric group (i.e., first polymeric group) that is a polymerized product of a first monomer composition that includes at least one ethylenically unsaturated monomer.

In a second aspect, a reaction mixture is described. The reaction mixture includes (1) a first compound of Formula (I) as described above and (2) a second compound having at least one acidic group.

In a third aspect, a grafted copolymer is described. The grafted copolymer is a product of a reaction mixture that includes a first compound of Formula (I) as described above and a second compound that is a polymeric material having at least one acidic group.

In a fourth aspect, a composition is provided that is a blended composition of the grafted copolymer described above and a polyamide. The polyamide included in the blended composition is selected 1) to have a melting temperature no greater than 200° C., 2) to be at least partially soluble in the composition at blending temperature, or 3) both 1) and 2).

DETAILED DESCRIPTION

Oxazolinyl-containing compounds having a single oxazolinyl group plus a first polymeric group are described. These compounds can be reacted with a second compound that has one or more acidic groups such as carboxyl groups to formed grafted compounds. This reaction results in the opening of the oxazolinyl ring on the first compound by the acidic group on the second compound and the formation of an attachment group that connects (i.e., grafts) the first polymeric group of the first compound to the second compound.

In some embodiments, the second compound is a second polymeric material having at least one acidic groups and the product of the reaction of the first compound of Formula (I) with the second compound results in the formation of a grafted copolymer. If the second polymeric material is a viscoelastic material, the resulting grafted copolymer can be used, for example, in various compositions such as adhesive compositions. The cohesive strength of the grafted copolymer is often greater than that of the second polymeric material. Blended compositions of the grafted copolymer with a polyamide are also described.

The recitation of any numerical range by endpoints is meant to include the endpoints of the range, all numbers within the range, and any narrower range within the stated range.

The term "a", "an", and "the" are used interchangeably with "at least one" to mean one or more of the elements being described.

The term "alkyl" refers to a monovalent group that is a radical of an alkane and includes groups that are linear, branched, cyclic, bicyclic, or a combination thereof. The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, ethylhexyl, and isobornyl.

The term "alkylene" refers to a divalent group that is a radical of an alkane. The alkylene can be straight-chained, branched, cyclic, bicyclic, or a combination thereof. The alkylene typically has 1 to 30 carbon atoms. In some embodiments, the alkylene contains 1 to 20, 1 to 10, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "amido" refers to a group of formula —(CO)NH—.

The term "aryl" refers to a monovalent group that is aromatic and carbocyclic. The aryl can have one to five rings that are connected to or fused to the aromatic ring. At least one ring is aromatic and any other ring can be aromatic, non-aromatic, or a combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or a combination thereof. At least one ring is aromatic and any other ring can be aromatic, non-aromatic, or a combination thereof. In some embodiments, the arylene group has up to 5 rings, up to 4 rings, up to 3 rings, up to 2 rings, or one aromatic ring. For example, the arylene group can be phenylene, biphenylene, terphenylene, fluorenylene, or naphthalene.

The term "aralkyl" refers to a monovalent group that is an alkyl group substituted with an aryl group.

The term "aryloxy" refers to a monovalent group of formula —OAr where Ar is an aryl group.

The term "aryloxyalkyl" refers to a monovalent group that is an alkyl substituted with an aryloxy group.

The term "carbonyl" refers to a divalent group of formula —(CO)— where the carbon is attached to the oxygen with a double bond.

The term "carbonyloxy" are used interchangeably to refer to a divalent group of formula —(CO)O.

The term "carboxyl" refers to the group —(CO)OH and/or the salt thereof.

The term "carbonylimino" refers to a divalent group of formula —(CO)NR$^b$— where R$^b$ is hydrogen, alkyl, aryl, aralkyl, acyl, alkylsulfonyl, or arylsulfonyl.

The term "heteroalkyl" refers to a monovalent group that is an alkyl group in which one or more —CH$_2$— groups are replaced with thio, oxy, or —NR$^a$— where R$^a$ is hydrogen or alkyl. The heteroalkyl can be linear, branched, cyclic, bicylic, or a combination thereof and can include up to 60 carbon atoms and up to 40 heteroatoms. In some embodiments, the heteroalkyl group includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "heteroalkylene" refers to a divalent alkylene having one or more —CH$_2$— groups replaced with a thio, oxy, or —NR$^a$— where R$^a$ is hydrogen or alkyl. The heteroalkylene can be linear, branched, cyclic, bicyclic, or a combination thereof and can include up to 60 carbon atoms and up to 40 heteroatoms. In some embodiments, the heteroalkylene includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "heteroarylene" refers to a divalent group that is aromatic and heterocyclic. That is, the heteroarylene includes at least one heteroatom in an aromatic ring having 5 or 6 members. Suitable heteroatoms are typically oxy, thio, or —NR$^3$— where R$^3$ is hydrogen or an alkyl. The group can have one to five rings that are connected, fused, or a combination thereof. At least one ring is heteroaromatic and any other ring can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

The term "(meth)acrylic acid" refers to both acrylic acid and methacrylic acid. Likewise, the term "(meth)acrylate" refers to both an acrylate (i.e., acrylate ester) and a methacrylate (i.e., methacrylate ester) and the term "(meth)acrylamide" refers to both an acrylamide and a methacrylamide.

The term "oxy" refers to a divalent group —O—.

The term "polyamide" refers to a polymer having multiple amido groups of formula —(CO)NH—.

The term "blending temperature" refers to the temperature used to blend the grafted copolymer and the polyamide. The blending temperature is often in a range of ambient temperature up to 300° C., ambient temperature up to 250° C., or ambient temperature up to 200° C.

As used herein, the terms "polymer" or "polymeric" refers to a material that is a homopolymer, copolymer, terpolymer, or the like. Likewise, the terms "polymerize" or "polymerization" refers to a process of making a homopolymer, copolymer, terpolymer, or the like. The terms "copolymer" or "copolymeric" can be used to refer to a polymer prepared using two or more different monomers.

Oxazolinyl-containing compounds are provided that have an oxazolinyl group plus a first polymeric group are of Formula (I)

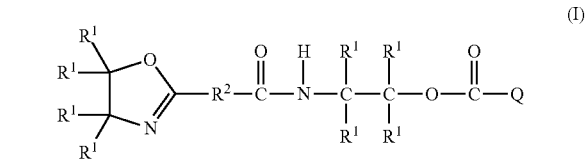

In Formula (I), each R$^1$ is independently hydrogen, alkyl, aryl, or aralkyl. The R$^2$ group is a single bond or a divalent group containing an alkylene, heteroalkylene, arylene, heteroarylene, or a combination thereof. Group R$^2$ can optionally further include an oxy, carbonyl, carbonyloxy, carbonylimino, —NR$^3$—, or a combination thereof. Group R$^3$ is hydrogen or an alkyl (e.g., an alkyl having 1 to 10 carbon atoms, 1 to 6 carbon atoms, 1 to 4 carbon atoms, or 1 to 3 carbon atoms). Group Q is a first polymeric group that is a polymerized product of a first monomer composition that includes at least one ethylenically unsaturated monomer.

Each $R^1$ independently can be a hydrogen, alkyl, aryl, or aralkyl group. In many embodiments, at least one $R^1$ group is hydrogen. For example, all of the $R^1$ groups can be hydrogen. In some embodiments, at least one $R^1$ group is an alkyl, aryl, or aralkyl. Suitable alkyl groups for $R^1$ typically have 1 to 10 carbon atoms, 1 to 6 carbon atoms, 1 to 4 carbon atoms, or 1 to 3 carbon atoms. Suitable aryl groups often have 6 to 12 carbon atoms. Example aryl groups include, but are not limited to, phenyl and biphenyl. Suitable aralkyl groups often have an alkyl group with 1 to 10 carbon atoms, 1 to 6 carbon atoms, or 1 to 4 carbon atoms and a aryl group having 6 to 12 carbon atoms. Example aralkyl groups are an alkyl having 1 to 10 carbon atoms substituted with a phenyl group or biphenyl group.

In some embodiments, $R^2$ is a single bond. In other embodiments, $R^2$ is a divalent group containing at least one alkylene, heteroalkylene, arylene, heteroarylene, or a combination thereof. In these embodiments, $R^2$ can further include an oxy, carbonyl, carbonyloxy, carbonylimino, —$NR^3$—, or a combination thereof. That is, in some embodiments, $R^2$ is an alkylene, a heteroalkylene, an arylene, a heteroarylene, or a combination thereof. In other embodiments, $R^2$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof.

In some embodiments, $R^2$ includes a first group that is an alkylene, heteroalkylene, arylene, heteroarylene, or combination thereof connected to a second group that is an alkylene, heteroalkylene, arylene, heteroarylene, or combination thereof using a first linking group that is an oxy, carbonyl, carbonyloxy, carbonylimino, —$NR^3$—, or a combination thereof. The second group can be further connected to a third group that is an alkylene, heteroalkylene, arylene, heteroarylene, or combination thereof using a second linking group that is an oxy, carbonyl, carbonyloxy, carbonylimino, —$NR^3$—, or combination thereof. The third group can be further connected to a fourth group that is an alkylene, heteroalkylene, arylene, heteroarylene, or combination thereof using a third linking group that is an oxy, carbonyl, carbonyloxy, carbonylimino, —$NR^3$—, or a combination thereof. Additional groups selected from an alkylene, heteroalkylene, arylene, heteroarylene, or combination thereof can be further connected using additional linking groups selected from an oxy, carbonyl, carbonyloxy, carbonylimino, —$NR^3$—, or a combination thereof.

Exemplary alkylene $R^2$ groups have 1 to 30 carbon atoms, 1 to 20 carbon atoms, 1 to 12 carbon atoms, 1 to 6 carbon atoms, or 1 to 4 carbon atoms. Exemplary heteroalkylene $R^2$ groups have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms. Exemplary arylene $R^2$ groups include, but are not limited to, phenylene (e.g., meta-phenylene or para-phenylene) and biphenylene. Exemplary heteroarylene $R^2$ groups include, but are not limited to, triazine-diyl, pyridine-diyl, pyrimidine-diyl, and pyridazine-diyl.

Some compounds of Formula (I) are also compounds of Formula (Ia).

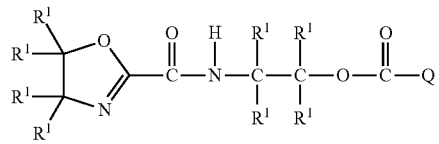

The group $R^2$ in Formula (I) is equal to a single bond in Formula (Ia).

Other compounds of Formula (I) are also compounds of Formula (Ib).

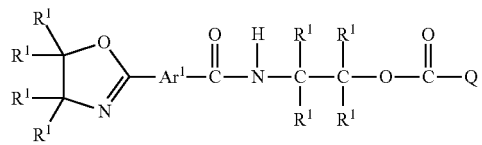

The group $R^2$ in Formula (I) is equal to an arylene $Ar^1$ in Formula (Ib). Although any suitable arylene group can be used, the arylene is often para-phenylene as in Formula (Ic) or meta-phenylene as in Formula (Id).

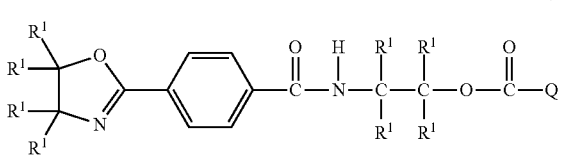

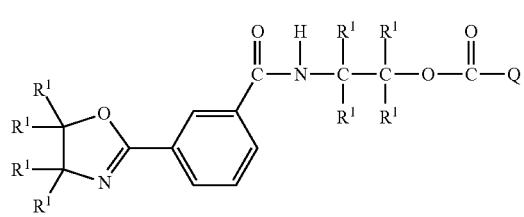

Still other compounds of Formula (I) have a $R^2$ group that is an alkylene as shown in Formula (Ie).

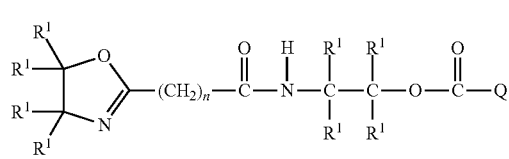

The variable n can be any suitable integer but is often no greater than 30, no greater than 20, no greater then 10, or no greater than 6. The integer is often at least 1, at least 2, or at least 3. For example, the variable n can be in the range of 1 to 30, in the range of 1 to 20, in the range of 1 to 10, or in the range of 1 to 6. Some more specific compounds of Formula (Ie) are of Formula (If) where n is equal to 2 and Formula (Ig) where n is equal to 4.

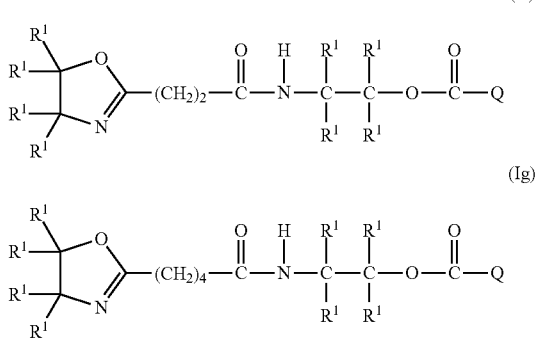

(If)

(Ig)

Yet other compounds of Formula (I) have a $R^2$ group that is a heteroalkylene. Suitable heteroalkylene groups are often of formula $-(C_pH_{2p}D)_m-(C_qH2_q)-$ where p and q are each independently an integer in the range of 1 to 10, in the range of 1 to 6, or in the range of 1 to 4 and where m is an integer in the range of 1 to 20, in the range of 1 to 10, in the range of 1 to 6, or in the range of 1 to 4. Group D is often oxy or thio. In some more specific embodiments, the compounds of Formula (I) are of Formula (Ih) where D is oxy or thio.

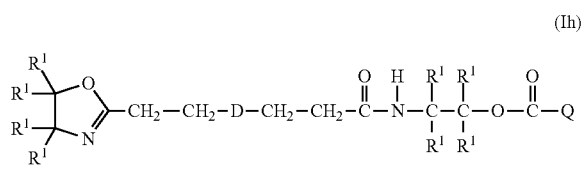

(Ih)

All of the compounds of Formula (I) and (Ia) to (Ih) have a group Q, which is a polymeric group that is a polymerized product of a first monomer composition that includes at least one ethylenically unsaturated monomer. The polymerization reaction can be a free radical polymerization reaction or an anionic polymerization reaction.

Any suitable ethylenically unsaturated monomer can be used to form polymeric group Q (i.e., first polymeric group Q). Suitable monomers include, but are not limited to, various (meth)acrylates (i.e., various (meth)acrylate esters), (meth) acrylic acids, (meth)acrylamides, vinyl compounds, or the like. In some embodiments, Q is a homopolymeric group in which all of the monomers used to form the polymeric group are the same. In other embodiments, Q is a random copolymer or a block copolymer.

In some embodiments, the polymeric group Q of the compound of Formula (I) is formed from one or more (meth) acrylates. The (meth)acrylates are often In Formula (II).

(II)

In this formula, group $R^{10}$ is hydrogen or methyl and group $R^9$ is an alkyl, heteroalkyl, aryl, aralkyl, or aryloxyalkyl. Suitable alkyl groups often have 1 to 20 carbon atoms, 1 to 10 carbon atoms, 1 to 6 carbon atoms, or 1 to 4 carbon atoms. Suitable heteroalkyl groups often have 2 to 30 carbon atoms and 1 to 16 heteroatoms, 2 to 20 carbon atoms and 1 to 12 carbon atoms, 2 to 10 carbon atoms and 1 to 6 heteroatoms, or 2 to 6 carbon atoms and 1 to 4 heteroatoms. The alkyl and heteroalkyl groups can be linear, branched, cyclic, bicyclic, or a combination thereof. Suitable aralkyl groups often have 7 to 18 carbon atoms. An example is an alkyl group substituted with phenyl. Suitable aryloxyalkyl groups often have 7 to 18 carbon atoms. An example is an alkyl group substituted with an oxyphenyl. These monomers, when formed into a homopolymer, can have a wide range of glass transition temperatures.

The monomers can be selected that provide a desired glass transition temperature depending on a particular use of the compound of Formula (I). More specifically, polymeric Q groups with a glass transition temperature greater than or equal to 20° C. or higher tend to be thermoplastic. As used herein, the term "thermoplastic" refers to a polymeric material that flows when heated and then return to its original state when cooled to room temperature. The polymeric groups with a glass transition temperature that is less than 20° C. tend to be rubbery. As used herein, the term "rubbery" refers to a polymeric material that has elastic properties characteristic of natural rubber.

In some embodiments, the monomers of Formula (II) used to form the polymeric group Q are selected from (meth) acrylates such as n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methylbutyl acrylate, 4-methyl-2-pentyl acrylate, n-octyl acrylate, n-propyl acrylate, and n-octyl methacrylate. These monomers, when formed into a homopolymeric group, tend to have a glass transition temperature less than 20° C., less than 10° C., or less than 0° C.

In other embodiments, the monomers of Formula (II) used to form the polymeric group Q are selected from (meth) acrylates (i.e., (meth)acrylate esters) such as methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl (meth)acrylate, isobornylcyclohexyl acrylate, tetrahydrofurfuryl methacrylate, trifluoroethyl methacrylate, 1-adamantyl methacrylate, dicyclopentenyloxylethyl (meth)acrylate, dicyclopentanyl (meth)acrylate, and 3,3,5 trimethylcyclohexyl (meth)acrylate. These monomers, when formed into a homopolymeric group, tend to have a glass transition temperature that is equal to at least 20° C., at least 30° C., at least 40° C., or at least 50° C.

Any of the (meth)acrylate monomers can be optionally substituted with a group such as an amino group, hydroxyl group, or epoxy group. The substituents tend to enhance the polarity of the monomers. Examples of (meth)acrylates with a hydroxyl substituent include, but are not limited to, 2-hydroxyethyl (meth)acrylate, 2-hydroxypropyl (meth)acrylate, and 4-hydroxylbutyl (meth)acrylate. Examples (meth)acrylates with an epoxy substituent include, but are not limited to, glycidyl (meth)acrylate. Examples of (meth)acrylates with an amino group include, but are not limited to, N,N-dialkyl (meth)acrylates such as dimethylaminoethyl (meth)acrylate.

The (meth)acrylates can also be an alkoxyalkyl (meth) acrylate or poly(alkoxyalkyl (meth)acrylate) such as, for example, 2-(2-ethoxyethoxy)ethyl (meth)acrylate, 2-ethoxyethyl (meth)acrylate, 2-methoxyethoxyethyl (meth)acrylate, 2-methoxyethyl (meth)acrylate, and polyethylene glycol mono(meth)acrylates. These tend to be polar molecules.

The polymeric group Q is typically prepared from non-acidic monomers. If group Q is prepared from a mixture of monomers, at least 90 weight percent, at least 95 weight percent, at least 97 weight percent, at least 98 weight percent, or at least 99 weight percent of the monomers do not have an acidic group (i.e., the monomers are free of acidic groups) such as carboxyl group. In some embodiments, all of the monomers in the first monomer composition are free of acidic groups. If the content of acidic monomers used to form polymeric group Q is too great, it can be difficult to prepare a compound of Formula (I) with a single oxazolinyl group.

Some specific Q groups are prepared from (meth)acrylates such as, for example, poly(benzyl methacrylate), poly(m-ethyl methacrylate), poly(phenoxyethyl acrylate), and random or block poly(isobornyl acrylate-co-benzyl methacrylate).

Other suitable ethylenically unsaturated monomers for forming polymeric group Q are (meth)acrylamide, alkyl acrylamides such as t-butyl acrylamide, monoalkylaminoalkyl acrylamides such as methylaminoethyl acrylamide, dialkylaminoalkylacrylamides such as dimethylaminoethylacrylamide, and the like.

Still other suitable ethylenically unsaturated monomers that can be used to form polymeric group Q are various vinyl monomers such as, vinyl ether monomers, vinyl aryl monomers, vinyl heterocyclic monomers, vinyl ester monomers, and the like. Suitable vinyl ether monomers include, for example, vinyl methyl ether. Suitable vinyl aryl monomers include, but are not limited to, styrene, alpha-methyl styrene, alkyl substituted sytrenes (e.g., vinyl toluene, dimethylstyrene, ethylstyrene, isopropylstyrene, and tert-butylstyrene), and the like. Any of these vinyl aryl monomers optionally can be substituted with one or more groups selected from amino, hydroxyl, alkoxy, halo, and the like. Suitable vinyl heterocyclic monomers include, but are not limited to, 2-vinyl pyridine, 4-vinyl pyridine, and n-vinyl caprolactam. Suitable vinyl esters include, but are not limited to, vinyl acetate and vinyl propionate. Monomers such as vinyl aryl monomers, vinyl heterocyclic monomers, and some vinyl ester monomers, when formed into a homopolymeric group, tend to have a glass transition temperature that is at least 20° C., at least 30° C., at least 40° C., or at least 50° C.

Some specific Q polymeric groups are prepared from vinyl monomers such as a vinyl aryl monomer, vinyl heterocyclic monomer, or a combination thereof. These Q groups can be homopolymers, random copolymers, or block copolymers. The block copolymers can have two or more blocks. Some block copolymers have a first block of poly(vinyl aryl monomer) and a second block of poly(vinyl heterocyclic monomer). Some specific polymeric examples are poly(styrene), random poly(styrene-co-vinyl pyridine), and di-block poly(styrene-co-vinyl pyridine).

The polymeric group Q can have any suitable molecular weight. In many embodiments, the weight average molecular weight (Mw) is greater than the 5,000 grams/mole (i.e., 5,000 Daltons). For example, the weight average molecular weight can be greater than 7,500 grams/mole, greater than 10,000 grams/mole, greater than 12,000 grams/mole, greater than 15,000 grams/mole, or greater than 20,000 grams/mole. The weight average molecular weight is often up to 150,000 grams/mole, up to 120,000 grams/mole, up to 100,000 grams/mole, up to 80,000 grams/mole, up to 60,000 grams/mole, or up to 40,000 grams/mole. If the molecular weight is too great, the resulting compound of Formula (I) can have an unacceptably low concentration of the oxazolinyl group based on the weight of the first compound. That is, the weight percent of the compound attributable to the oxazolinyl group may be unacceptably low compared to the weight percent of the first compound attributable to the polymeric group.

Although the polymeric group Q can be formed by either anionic polymerization or free radical polymerization, free radical polymerization techniques are often used. The polymerization reaction typically occurs in the presence of an initiator. Although any known initiator can be used, the initiator is often an azo compound. Suitable azo compounds include, but are not limited to, 2,2'-azobis(isobutyronitrile) commercially available under the trade designation VAZO 64 from DuPont (Wilmington, Del.), 2,2'-azobis(2-methylbutyronitrile) commercially available under the trade designation VAZO 67 from DuPont, 2,2'-azobis(2,4-dimethylpentanenitrile) commercially available under the trade designation VAZO 52 from DuPont, and 4,4'-azobis(4-cyanovaleric acid). The use of a carboxyl-containing initiator such as 4,4'-azobis(4-cyanovaleric acid) is often preferred because such an initiator tends to increase the likelihood that the polymeric intermediate (Q-(CO)—OH) involved in the preparation of the compounds of Formula (I) has a carboxyl group. The initiator is typically added in an amount in the range of 0.01 to 5 weight percent, in the range of 0.05 to 3 weight percent, in the range of 0.05 to 2 weight percent, in the range of 0.05 to 1 weight percent, or in the range of 0.1 to 1 weight percent based on the weight of monomers in the monomer composition. The amount of initiator can be used to control the weight average molecular weight of the polymeric group Q. More polymeric chains are formed when greater amounts of the initiator are used. This leads to polymeric chains with a lower weight average molecular weight. Conversely, fewer polymeric chains with a higher weight average molecular weight are formed with smaller amounts of initiator.

The monomer composition used to form the polymeric group Q can also include a chain transfer agent to control the molecular weight. Examples of useful chain transfer agents include, but are not limited to, carbon tetrabromide, alcohols, mercaptans, and mixtures thereof. The use of carboxyl-containing chain transfer agents such as, for example, 3-mercaptopropionic acid is often preferred. These carboxyl-containing chain transfer agent tend to increase the likelihood that the polymeric intermediate involved in the preparation of the compounds of Formula (I) has a carboxyl group.

Chain transfer agents can be used with most ethylenically unsaturated monomers. When a chain transfer agent is used, one end of the polymeric material is often a group derived from the initiator while the other end can be a group derived from the chain transfer agent. At least one of the initiator or chain transfer agent can be selected to provide acidic functionality (e.g., a carboxyl group). Using both an initiator and a chain transfer agent that include an acidic functionality tends to increase the likelihood that most polymeric chains will contain an acidic functionality.

Instead of a chain transfer agent, the monomer composition can include a nitroxide mediating agent such as, for example, 2,2,6,6-tetramethyl-1-piperidinyloxy (TEMPO) commercially available from Alfa Aesar (Ward Hill, Mass.), 1,1,3,3-tetraethyl-2,3-dihydro-1H-isoindolin-2-yloxyl, di-tert-butyl nitroxide, or 4-oxo-TEMPO commercially available from Alfa Aesar. The polymerization reaction is considered to be "living" or "controlled" and can be initiated and terminated as desired. The mechanism of control relies on the reversible coupling of the nitroxide mediating agent to the free radical on the active (i.e., propagating) polymer chain to form an alkoxy amine linkage. The addition of the nitroxide mediating agent makes the polymer chain dormant and unable to further propagate. At certain temperatures, however, the alkoxy amine linkage can be cleaved allowing the polymer chain to become active and continue to grow. Thus, equilibrium between active and dormant polymer chains can be controlled though the selection of the temperature range that is used for polymerization. The temperature range is typically in the range of 100° C. to 160° C. The resulting polymeric material tends to have a relatively narrow molecular weight distribution.

Nitroxide mediating agents are often used in the polymerization of monomers such as styrene. When a nitroxide compound is used, one end of the polymeric material is often a group derived from the initiator and the other end can be the nitroxide compound. At least one of these is typically selected to provide acid functionality (e.g., a carboxyl group). For example, if the initiator is 4,4'-azobis(4-cyanovaleric acid) and the nitroxide mediating agent TEMPO are used, one end of the polymer is usually the group —NH—C(CN)(CH$_3$)—CH$_2$—CH$_2$—COOH. In this example, the carboxyl group is provided by the initiator.

In some cases the nitroxide mediating agent and the initiating species can be obtained from one compound. For example, some alkoxyamine compounds can decompose at a particular temperature to yield both an initiating radical and a nitroxide radical. Such an initiator is described in an article by Messerschmidt et al. (Macromolecules, 41 (2008)). The initiating species from the decomposed alkoxyamine also may have a carboxyl group, leaving the generated polymeric group with a carboxyl group at one end of the chain. The other end of the chain is capped with the nitroxide portion of the decomposed alkoxyamine compound. One such compound described in articles by Leenen et al. (*e-Polymers,* 71 (2005)) and Dufils et al. (*Polymer,* 48 (2007)), is 2-methyl-2-(N-tert-butyl-N-(1'diethylphosphono-2,2'-dimethylpropyl)aminoxyl)propanoic acid.

As used herein, the term "polydispersity" or "polydispersity index" is a measure of the molecular weight distribution and refers to the weight average molecular weight (Mw) divided by the number average molecular weight (Mn) of the polymer. Polymeric materials that are all of the same molecular weight have a polydispersity of 1.0 while polymeric materials that have more than one molecular weight have a polydispersity greater than 1.0. The polydispersity can be determined, for example, using gel permeation chromatography. The polydispersity index is typically less than 10.0, less than 5.0, less than 2.0, less than 1.5, less than 1.4, less than 1.3, less than 1.2, or less than 1.1. When a nitroxide mediating agent is used, the polydispersity index is often in the range of 1.0 to 1.4, in the range of 1.0 to 1.3, or in the range of 1.0 to 1.2. If a non-living polymerization method is used such as when a traditional chain transfer agent is used in place of a nitroxide mediated agent, the polydispersity index is often in the range of 1.5 to 10.0, in the range of 1.5 to 6.0, in the range of 1.5 to 4, in the range of 1.5 to 2.0, in the range of 1.5 to 2.0, or in the range of 1.6 to 2.0.

The compounds of Formula (I) can be formed as shown in Reaction Scheme A.

Reaction Scheme A

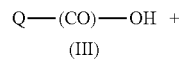
(III)

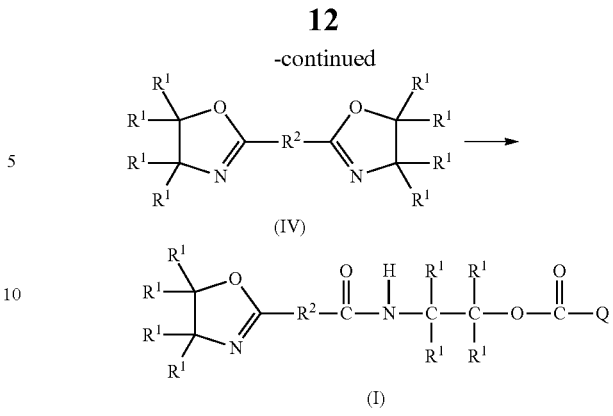

In Reaction Scheme A, the compound of Formula (III) is the carboxyl-terminated polymer. Group Q is a first polymeric group that includes a polymerized product of a first monomer composition that includes at least one ethylenically unsaturated monomer. Group Q is often prepared by free radical polymerization methods or anionic polymerization methods. The compound of Formula (IV) is a bis-oxazoline compound. The polymeric group Q in Formula (III) and the groups $R^1$ and $R^2$ in Formula (IV) as the same as defined above for Formula (I).

The compound of Formula (III) typically has only one carboxyl group. That is the polymeric group Q usually does not contain a carboxyl group or only a small amount of carboxyl groups. Multiple carboxyl groups in polymeric group Q tend to result in the formation of chemical crosslinks when reacted with the bis-oxazoline compound of Formula (IV). However, if the concentration of carboxyl groups is sufficiently low, the likelihood of reaction of these groups with the bis-oxazoline compound can be minimized. That is, low levels of carboxyl groups in group Q can be used.

Some suitable bis-oxazoline compounds of Formula (IV) are commercially available. These include, but are not limited to, 1,4-phenylene bis-oxazoline, 1,3-phenylene bis-oxazoline, 2,2'-bis-(2-oxazoline), thiodiethylene-bis-(2-oxazoline), tetramethylene-bis-(2-oxazoline), oxydiethylene-bis-(2-oxazoline), and 1,2-bis(4,4-dimethyl-2-oxazolin-2-yl)ethane. In some embodiments, the use of 1,4-phenylene bis-oxazoline, 1,3-phenylene bis-oxazoline, and 2,2'-bis-(2-oxazoline) are preferred.

These and other bis-oxazoline compounds can be prepared using any known method. In some synthesis methods, the bis-oxazoline compounds are prepared by ring closure of the corresponding bisamide alcohol with a hydration agent. Suitable dehydration agents include, but are not limited to, concentrated sulfuric acid or thionyl chloride. In other synthesis methods, the bis-oxazoline compounds can be prepared by ring closure of the corresponding bisamide halide with a base. In yet other synthesis methods, the bis-oxazoline compounds are prepared by heating (e.g., to about 180° C.) a dinitrile and either an ethanol amine or propanol amine in the presence of a Lewis acid. Details of these synthesis methods are further described in European Patent EP 1548012 (Mayer et al.), PCT Patent Application Publication WO 96/34909 (Loontjens et al.), in an article by A. Krosropour, (*Synlett.,* 18, 2747 (2005)) and in an article by H. Togo (*Synthesis,* 14, 2329 (2009)).

Reaction Scheme A typically uses a molar excess of oxazolinyl groups in the bis-oxazoline compound of Formula (IV) to acidic groups in the compound of Formula (III). The number of moles of oxazolinyl groups is often at least 2 times, at least 2.5.times, at least 3 times, at least 3.5 times, or at least 4 times the number of moles of acidic groups. This excess tends to minimize the reaction of both of the oxazolinyl groups in the bis-oxazoline compound with the carboxyl-terminated polymer of Formula (III). The reaction results in the ring opening of one but not both of the oxazolinyl rings. The desired product of Formula (I) has an oxazolinyl group that has not been ring opened by reaction with the carboxyl-terminated polymer of Formula (III).

Reaction Scheme A typically can occur in the presence of a solvent that is miscible with the polymers of Formula (III) and the bis-oxazoline compounds of Formula (IV). A temperature in the range of 50° C. to 80° C., in the range of 55° C. to 75° C., or in the range of 55° C. to 65° C. is often used. Suitable solvents for preparation of the compound of Formula (I) include, but are not limited to, toluene, xylenes, ethyl acetate, and methyl ethyl ketone. The resulting oxazolinyl-terminated polymer of Formula (I) is then precipitated by the addition of a large amount of solvent that is immiscible with the oxazolinyl-terminated polymer. The volume of solvent is often at least 5 times, at least 6 times, at least 8 times, or at least 10 times the volume of the product solution. Suitable solvents for the precipitation of the product (i.e., compounds of Formula (I)) include, but are not limited to, methanol. The precipitated polymeric material can then be filtered and dried. The percent yield is often greater than 85 percent, greater than 90 percent, greater than 92 percent, or greater than 95 percent.

Reaction Scheme A provides a flexible method for preparing the compounds of Formula (I). More specifically, the formation of the intermediate carboxyl-containing compound Q-(CO)OH using a free radical polymerization reaction allows great flexibility in the selection of monomers used to form the polymeric group Q.

Once formed, the first compound of Formula (I) can be reacted with a second compound that has an acidic group to form a grafted compound. Stated differently, a reaction mixture is provided that includes (1) a first compound of Formula (I) and (2) a second compound having at least one acidic group. The reaction of the first compound with the second compound results in the formation of an attachment group that grafts the first polymeric group Q to the second compound. The attachment group results from the reaction of the oxazolinyl group of the first compound of Formula (I) with the acidic group on the second compound.

Reaction Scheme B is an example of one such reaction to form a grafted compound. In this reaction scheme, the compound of Formula (I) is reacted with a carboxyl-containing compound G-(CO)OH to form the grafted compound of Formula (VI). In this reaction scheme, the acidic groups on the second compound are carboxyl groups. The group G in Formulas (V) and (VI) can be any suitable organic group and is often a polymeric group.

Reaction Scheme B

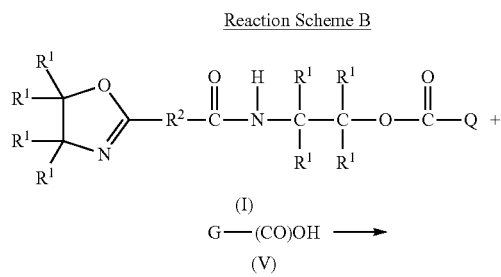

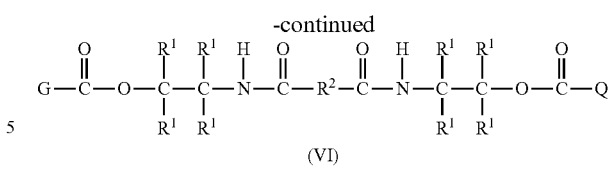

(VI)

Although the carboxyl-containing compound G-(CO)OH of Formula (V) is shown in this reaction scheme with only one carboxyl group for ease of explanation, this compound can have any suitable number of carboxyl groups. That is, the final product can include multiple groups of formula —(CO)OC $(R^1)_2C(R^1)_2NH$—(CO)—$R^2$—(CO)—NH—$C(R^1)_2C$ $(R^1)_2$—O(CO)-Q. If the second compound has multiple carboxyl groups, all or any fraction of these carboxyl groups can react with the compound of Formula (I).

In some embodiments, the second compound is a polymeric material (i.e., second polymeric material) having at least one acidic group. Stated differently, a grafted copolymer is provided that is a product of a reaction mixture that includes (1) a first compound of Formula (I) as described above and (2) a second compound that is a polymeric material (i.e., second polymeric material) having at least one acidic group. The second polymeric material often has multiple acidic groups. The product of the reaction is a grafted copolymer with the second polymeric material being the backbone of the grafted copolymer and with the polymeric groups Q from the first compound being part of the pendant groups. If the acidic groups are carboxyl groups, the grafted copolymer can have one or more groups of formula —(CO)OC$(R^1)_2C(R^1)_2$NH—(CO)—$R^2$—(CO)—NH—$C(R^1)_2C(R^1)_2$—O(CO)-Q where $R^1$, $R^2$, and Q are the same as defined above.

Any polymeric material having at least one acidic group can be used as the second polymeric material. Preferably, the second polymeric material has multiple acidic groups. Some suitable second polymeric materials are formed by polymerization of a second monomer composition that includes an acidic monomer. Suitable acidic monomers typically have an ethylenically unsaturated group plus an acidic group or a salt of an acidic group. The acidic monomer can be, for example, an ethylenically unsaturated carboxylic acid (i.e., the acidic group is a —COOH group), an ethylenically unsaturated phosphonic acid (i.e., the acidic group is a —$PO_3H_2$ group), an ethylenically unsaturated sulfonic acid (i.e, the acidic group is a —$SO_3H$ group), or a salt thereof. Multiple acidic monomers can be used. If multiple acidic monomers are used, they can have the same or different acidic groups.

Example acidic monomers include, but are not limited to, (meth)acrylic acid, itaconic acid, fumaric acid, crotonic acid, citraconic acid, maleic acid, oleic acid, β-carboxyethyl acrylate, 2-acrylamidoethanesulfonic acid, 2-acrylamido-2-methylpropane sulfonic acid, 2-methacrylamido-2-methylpropane sulfonic acid, 2-sulfoethyl methacrylate, styrene sulfonic acid, vinylsulfonic acid, vinylphosphonic acid, and the like. If the acidic monomer is in the form of a salt, the cation of the salt can be an alkaline metal (e.g., sodium, potassium, or lithium ion), an ion of an alkaline earth (e.g., calcium, magnesium, or strontium ion), an ammonium ion, an ammonium ion substituted with one or more alkyl groups, an ammonium ion substituted with one or more aryl groups, or an ammonium ion substituted by one or more aryl groups and one or more alkyl groups. In many embodiments, the acidic monomer is an ethylenically unsaturated carboxylic acid (i.e., the acid group is a carboxyl group).

In some examples, the second polymeric material is a homopolymer of the acidic monomer. For example, the second polymeric material can be a poly(meth)acrylic acid. In other examples, the second polymeric material is a copolymer formed from a second monomer composition that includes an acidic monomer plus at least one other ethylenically unsaturated monomer. Any of the ethylenically unsaturated monomers described above as suitable monomers for the formation of polymeric group Q in Formula (I) can be used in the second monomer composition.

Some more specific second polymeric materials can be formed, for example, from a second monomer composition that includes (a) a (meth)acrylic acid and (b) at least one (meth)acrylate (i.e., (meth)acrylate ester). The (meth)acrylate ester monomer is the reaction product of a (meth)acrylic acid with a non-tertiary alcohol. The non-tertiary alcohol typically has 1 to 20 carbon atoms, 1 to 18 carbon atoms, 3 to 18 carbon atoms, 1 to 14 carbon atoms, 1 to 12 carbon atoms, 2 to 12 carbon atoms, 3 to 12 carbon atoms, or 4 to 12 carbon atoms. The alcohol can be of formula $R^{11}OH$ where $R^{11}$ is an alkyl group (including a linear alkyl group, cycloalkyl group or bicycloalkyl group), alkenyl group, aryl group, or aralkyl group. Suitable examples of non-tertiary alcohols include, but are not limited to, methanol, ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, cyclohexanol, 2-methyl-1-pentanol, 3-methyl-1-pentanol, 4-methyl-2-pentanol, 2-ethyl-1-butanol, 3,5,5-trimethyl-1-hexanol, 3-heptanol, 1-octanol, 2-octanol, 2-ethyl-1-hexanol, 2-methyl-1-hexanol, 1-nonanol, 2-nonanol, 1-decanol, 2-decanol, 1-dodecanol, 1-tridecanol, 2-tridencanol, 1-tetradecanol, 1-octadecanol, 2-octadecanol, citronellol, dihydrocitronellol, 2-propylheptanol, isoborneol, phenylmethanol, phenoxyethanol, and the like.

The (meth)acrylate is often selected from methyl acrylate, ethyl acrylate, n-butyl acrylate, lauryl acrylate, 2-ethylhexyl acrylate, cyclohexyl acrylate, isooctyl acrylate, octadecyl acrylate, nonyl acrylate, decyl acrylate, isobornyl acrylate, dodecyl acrylate, benzyl acrylate, and mixtures thereof.

Other optional co-monomers can also be present in the second monomer composition. These optional co-monomers include, but are not limited to, (meth)acrylamide, N,N-dialkyl (meth)acrylamides (e.g., N,N-dimethylacrylamide and N,N-diethylacrylamide), N,N-dialkylaminoalkyl (meth)acrylate (e.g., N,N'-dimethylaminoethyl (meth)acrylate), (meth)acrylonitrile, vinyl acetate, N-vinyl pyrrolidone, cyanoalkyl (meth)acrylate (e.g., cyanoethyl acrylate), and hydroxyalkyl (meth)acrylates (e.g., hydroxyethylmethacrylate). Still other suitable co-monomers include poly(alkylene oxide) acrylates such as polyethylene glycol acrylate, ethoxyethyl acrylate, and ethoxyethoxyethylacrylate.

The second monomer composition can include, for example, 1 to 30 weight percent (meth)acrylic acid and 70 to 99 weight percent (meth)acrylate (i.e., (meth)acrylate ester). The weight percent is based on a total weight of monomers in the second monomer composition used to prepare the second polymeric material. Polymeric materials having this composition tend to be viscoelastic materials (i.e., elastomeric materials that can flow) with a glass transition temperature that is less than 20° C., less than 10° C., less then 0° C., less than −10° C., or less than −20° C. These grafted copolymers can be used in various adhesive compositions such as pressure-sensitive adhesive compositions. If higher amounts of (meth) acrylic acid are included, the glass transition temperature and stiffness of the second polymeric material may become undesirably high. If the (meth)acrylic acid is too low, however, the probability of reacting the second polymeric material with the first compound diminishes or there are very few grafted sites in the resulting grafted copolymer. The cohesive strength of the grafted polymer and any adhesive containing the grafted copolymer may become unacceptably low if there are too few grafted sites.

In some examples, the second monomer composition contains 1 to 25 weight percent (meth)acrylic acid and 75 to 99 weight percent (meth)acrylate ester, 1 to 20 weight percent (meth)acrylic acid and 80 to 99 weight percent (meth)acrylate ester, 1 to 15 weight percent (meth)acrylic acid and 85 to 99 weight percent (meth)acrylate ester, 1 to 10 weight percent (meth)acrylic acid and 90 to 99 weight percent (meth)acrylate ester, or 5 to 15 weight percent (meth)acrylic acid and 85 to 95 weight percent (meth)acrylate ester based on the total weight of monomers in the second monomer composition.

In addition to monomers, the second monomer composition typically also includes an initiator for free radical polymerization of the various monomers. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of monomers in the second monomer composition.

In some embodiments, a thermal initiator is used. The thermal initiator is typically a peroxide, azo compound, persulfate, or redox (reduction-oxidation) system. Suitable peroxides include, but are not limited to, benzoyl peroxide, cyclohexane peroxide, decanoyl peroxide, dicumyl peroxide, dicetyl peroxydicarbonate, and lauryl peroxide. Suitable azo compounds include, but are not limited to, 2,2'-azobis(2-methylbutane nitrile) that is commercially available under the trade designation VAZO 67 from DuPont (Wilmington, Del.), 2,2'-azobis(isobutyronitrile) that is commercially available as VAZO 64 from DuPont, and 2,2'-azobis(2,4-dimethylpentane nitrile) that is commercially available as VAZO 52 from DuPont. Suitable persulfates include, but are not limited to, potassium persulfate, sodium persulfate, and ammonium persulfate. Suitable redox systems include, but are not limited to, the combination of a persulfate with a reducing agent such as sodium metabisulfite or sodium bisulfite, a peroxide in combination with a tertiary amine such as dimethylaniline, or a hydroperoxide (e.g., cumene hydroperoxide) in combination with a transition metal (e.g., cobalt naphthanate).

In some embodiments, a photoinitiator is used. Some example photoinitiators are benzoin ethers (e.g., benzoin methyl ether or benzoin isopropyl ether) and substituted benzoin ethers (e.g., anisoin methyl ether). Other example photoinitiators are substituted acetophenones such as 2,2-diethoxyacetophenone or 2,2-dimethoxy-2-phenylacetophenone (commercially available under the trade designation IRGACURE 651 from Ciba Corp. (Tarrytown, N.Y.) or under the trade designation ESACURE KB-1 from Sartomer (Exton, Pa.)). Still other example photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(0-ethoxycarbonyl)oxime.

The second monomer composition typically also includes a chain transfer agent to control the molecular weight of the second polymeric material by regulating the free radical polymerization reaction. Suitable chain transfer agents include, but are not limited to, halogenated hydrocarbons (e.g., carbon tetrabromide), sulfur compounds such as mercaptans (e.g., lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and mercaptoethyl ether). Certain organic solvents can also function as a chain transfer agent such as ethanol, isopropanol, and ethyl acetate.

The amount of the chain transfer agent that is included in the second monomer composition depends on the desired molecular weight and on the specific chain transfer agent used. Compared to sulfur compounds, for example, organic solvents are usually less active and need to be present in larger quantities. The chain transfer agent is often present in an amount in the range of 0.001 to 10 weight percent based on a total weight of monomers in the second monomer composition. The amount is often in the range of 0.01 to 5 weight percent, 0.01 to 2 weight percent, 0.01 to 1 weight percent, or 0.01 to 0.5 weight percent based on the total weight of monomers in the second monomer composition.

The second polymeric material can be prepared from the second monomer composition using any suitable method or process (e.g., U.S. Pat. No. 5,986,011 (Ellis)). In many embodiments, a method without an inert organic solvent or a method with only a small amount of the inert organic solvent is used (e.g., less than 5 weight percent, less than 3 weight percent, less than 2 weight percent, less than 1 weight percent, or less than 0.5 weight percent based on the total weight of the second monomer composition). Such methods can be used if the monomers and the resulting copolymeric material are miscible with each other. In some embodiments, however, larger amounts of an inert organic solvent are used to provide miscibility of the reactants and product. When included in the second monomer composition, the inert organic solvent is typically no greater than 50 weight percent, no greater than 40 weight percent, no greater than 30 weight percent, no greater then 20 weight percent, no greater than 15 weight percent, or no greater than 10 weight percent based on the total weight of the second monomer composition.

In some processes used to form the second polymeric material, the second monomer composition can be positioned on a sheet, positioned between two sheets, or at least partially surrounded by a packaging material prior to polymerization. The sheets or packaging material are often selected based on the particular polymerization method used to prepare the second polymeric material. Flexible thermoplastic polymers such as, for example, ethylene-vinyl acetate copolymers, ethylene-acrylic acid copolymers, polypropylene, polyethylene, polybutadiene, poly(ethylene terephthalate), or iconomeric polymers can be used.

In some embodiments, the second monomer composition is polymerized within a packaging material such as a sealed pouch as described in U.S. Pat. No. 5,804,610 (Hamer et al.). The amount of packaging material used typically ranges from about 0.5 weight percent to about 20 weight percent based on a total weight of the packaging material and second monomer composition. For example, the packaging material can be in the range of 1 to 20 weight percent, 1 to 15 weight percent, 2 to 15 weight percent, 1 to 10 weight percent, 2 to 10 weight percent, 1 to 5 weight percent, or 2 to 5 weight percent.

The thickness of the packaging material is often in the range of 0.01 millimeters to 0.25 millimeters, in the range of 0.01 to 0.20 millimeters, in the range of 0.01 to 0.10 millimeters, or in the range of 0.03 to 0.10 millimeters. The pouch can have any suitable size but often the size is selected to contain 0.1 to 500 grams, 1 to 500 grams, 1 to 200 grams, 1 to 100 grams, 2 to 100 grams, 5 to 100 grams, or 5 to 50 grams of the second monomer composition.

If a thermal polymerization process is used, suitable sheets or packaging materials typically have melting temperatures that are above the polymerization temperature of the second monomer composition. The sheets or packaging materials often have a melting point of at least 90° C., at least 100° C., or at least 120° C. The melting point is often less than 200° C., less than 175° C., or less than 150° C. The polymerization temperature depends on the activation temperature of the thermal initiator. For example, reactions using 2,2'-azobis (isobutyronitrile) can be carried out at about 80° C. while reactions using 2,2'-azobis(2,4-dimethylpentane nitrile) can be carried out at about 70° C.

In some thermal polymerization processes, the packaging material containing the second monomer composition is immersed within a heat exchange medium for a time sufficient to polymerize the monomers. The heat exchange medium can be, for example, water, perfluorinated liquids, glycerine, or propylene glycol. Alternatively, the heat necessary for thermal polymerization can be provided by placing the packaged second monomer composition in proximity to a heated metal platen, heated metal rollers, or microwave energy.

If a photo-polymerization process is used, suitable sheets or packaging materials typically allow sufficient actinic radiation (e.g., ultraviolet radiation) to reach the second monomer composition through the sheets or packaging materials. Ultraviolet lights are often selected that have at least 60 percent or at least 70 percent of their emission spectra in the range of 280 to 400 nanometers and that have an intensity between about 0.1 to 25 mW/cm$^2$.

During some photo-polymerization processes, the temperature can be controlled by immersing sealed pouches containing the second monomer composition in a water bath or other heat transfer fluid. For example, the packaged second monomer composition can be immersed in a water bath controlled at temperatures up to 90° C. but is often controlled at temperatures no greater than 50° C. The temperature is often controlled in the range of 5 to 50° C., 5 to 40° C., or 5 to 30° C.

Although any desired molecular weight for the second polymeric material can be prepared and used in Reaction Scheme B, the weight average molecular weight is often at least 50,000 grams/mole, at least 100,000 grams/mole, at least 200,000 grams/mole, or at least 500,000 grams/mole. In some embodiments, the weight average molecular weight can be up to 3,000,000 grams/mole, up to 2,000,000 grams/mole, or up to 1,000,000 grams/mole. Mixing of the second polymeric material with the first compound can become more difficult as the molecular weight of the second polymeric material increases.

If the second polymeric material is a viscoelastic material, the weight average molecular weight is often in the range of 200,000 to 2,000,000 grams/mole, in the range of 200,000 to 1,000,000 grams/mole, in the range of 500,000 to 2,000,000 grams/mole, or in the range of 500,000 to 1,000,000 grams/mole. If the molecular weight is too high, the viscoelastic material is not easily processed. If the molecular weight if too low, however, the cohesive strength may be undesirably low.

To prepare a grafted copolymer, the second polymeric material having at least one acidic group (preferably multiple acidic groups) can be reacted with the first compound having both a single oxazolinyl group and a first polymeric group Q. In the case where the acidic groups on the second compound are carboxyl groups, the reaction results in the formation of a grafted copolymer having at least one pendant group (preferably multiple pendant groups) of formula —(CO)OC(R$^1$)$_2$C (R$^1$)$_2$NH—(CO)—R$^2$—(CO)—NH—C(R$^1$)$_2$C(R$^1$)$_2$—O (CO)-Q where R$^1$, R$^2$, and Q are the same as defined above.

If the second polymeric material is copolymer formed from a second monomer composition that contains (meth)acrylic acid and a (meth)acrylate ester, the resulting grafted copolymer often has a hydrocarbon backbone with pendant groups that include —(CO)OR$^{11}$ groups and —(CO)OC(R$^1$)$_2$C(R$^1$)$_2$NH—(CO)—R$^2$—(CO)—NH—C(R$^1$)$_2$C(R$^1$)$_2$—O(CO)-Q groups. The group R$^1$, R$^2$, R$^{11}$, and Q are the same as previously defined. The —(CO)OR$^{11}$ groups are from the (meth) acrylate esters included in the second monomer mixture. The pendant groups —(CO)OC(R$^1$)$_2$C(R$^1$)$_2$NH—(CO)—R$^2$—(CO)—NH—C(R$^1$)$_2$C(R$^1$)$_2$—O(CO)-Q result from reaction of a carboxyl group on the second polymeric material with the oxazolinyl group on the second compound. If there are non-reacted —(CO)OH groups from the (meth)acrylic acid used to form the second polymeric material, these groups can also be present in the grafted copolymer.

In some embodiments of the grafted copolymer, the second polymeric material is a viscoelastic material formed from a second monomer composition that contains (meth)acrylic acid and a (meth)acrylate ester while the first compound is selected to have a first polymeric group Q that is not miscible with the second polymeric material at ambient temperatures. That is, the first polymeric group Q phase separates from the second polymeric material. This phase separation results in the formation of separate domains of the first polymeric group that function as physical crosslinks for the grafted copolymer. The grafted copolymer can be used, for example, as an adhesive such as a pressure sensitive adhesive. The cohesive strength of the adhesive tends to increase with the introduction of more grafted groups (i.e., through the introduction of more —(CO)OC(R$^1$)$_2$C(R$^1$)$_2$NH—(CO)—R$^2$—(CO)—NH—C(R$^1$)$_2$C(R$^1$)$_2$—O(CO)-Q pendant groups) in the grafted compound.

Physical crosslinking typically relies on the natural or induced formation of entanglements within polymeric chains and tends to increase the cohesive strength of the grafted copolymer. Physical crosslinking is often desired because the compositions can be processed in a melted state at relatively high temperatures yet can take on a crosslinked form at lower temperatures. That is, the grafted copolymer can be hot melt processed and can be used as hot melt adhesives. The physical crosslinking is reversible. That is, the grafted copolymer can be repeatedly heated to flow and then cooled again to form a physically crosslinked material. In contrast, chemical crosslinked compositions typically cannot be hot melt processed. Hot melt processing is often considered desirable because the use of inert organic solvents can be minimized or eliminated. The minimization or elimination of inert organic solvents can be desirable from both an environmental and economic perspective.

To phase separate from a second polymeric material that is viscoelastic and to provide physical crosslinking, the first compound is often selected to be immiscible in the second compound at ambient temperatures. Physical crosslinking is enhanced when the first compound has a glass transition temperature greater than or equal to at least 20° C. To form such a first compound, the monomers used to form the first polymeric group Q are often selected to have a glass transition temperature equal to at least 20° C. or at least 50° C. when polymerized as a homopolymer. Suitable monomers can be (meth)acrylates or various vinyl monomers such as vinyl ether monomers, vinyl aryl monomers, vinyl heterocyclic monomers, vinyl ester monomers, and the like.

Specific monomers for forming polymeric group Q include, but are not limited to, methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl (meth)acrylate, isobornylcyclohexyl acrylate, tetrahydrofurfuryl methacrylate, trifluoroethyl methacrylate, 1-adamantyl methacrylate, dicyclopentenyloxylethyl (meth)acrylate, dicyclopentanyl (meth)acrylate, 3,3,5 trimethylcyclohexyl (meth)acrylate, styrene, alpha-methyl styrene, alkyl substituted styrene (e.g., vinyl toluene, dimethylstytrene, ethylstyrene, isopropylstyrene, tert-butyl-styrene), 2-vinyl pyridine, 4-vinyl pyridine, n-vinyl caprolactam, vinyl acetate, vinyl proprionate, or mixtures thereof.

In addition to the glass transition temperature, the molecular weight of the first compound (e.g., the molecular weight of the polymeric group Q) can affect whether or not the grafted copolymer will phase separate and physically crosslink. Phase separation is more likely if the molecular weight of the polymeric group Q in the first compound has a weight average molecular weight of at least 5000 grams/mole. That is, the first compound is selected to have a weight average molecular weight that is greater than 5000 grams/mole. The weight average molecular weight of the group Q is often greater than 7,500 grams/mole, greater than 10,000 grams/mole, greater than 12,000 grams/mole, greater than 15,000 grams/mole, or greater than 20,000 grams/mole. Cohesive strength of the pressure-sensitive adhesive tends to increase as the weight average molecular weight of the polymeric group Q increases.

If the molecular weight of the polymeric group Q becomes too large, however, the number of pendant groups formed on a weight basis by reaction with the second polymeric material may be diminished. That is, as the weight of the polymeric group Q increases, it can become more difficult to form many pendant groups of formula —(CO)OC(R$^1$)$_2$C(R$^1$)$_2$NH—(CO)—R$^2$—(CO)—NH—C(R$^1$)$_2$C(R$^1$)$_2$—O(CO)-Q on a weight basis. The weight average molecular weight of polymeric group Q is often up to 150,000 grams/mole. For example, the weight average molecular weight can be up to 120,000 grams/mole, up to 100,000 grams/mole, up to 80,000 grams/mole, up to 60,000 grams/mole or up to 40,000 grams/mole.

The grafted copolymer is often prepared from a reaction mixture that includes at least 0.5 weight percent of the first compound based on a total weight of polymeric material (e.g., first compound plus the second polymeric material). For example, the reaction mixture used to form the grafted copolymer can contain 0.5 to 20 weight percent of the first compound and 80 to 99.5 weight percent of the second polymeric material based on a total weight of polymeric material (e.g., the first compound and the second polymeric material) in the reaction mixture. This reaction mixture often contains 1 to 15 weight percent first compound and 85 to 99 weight percent second polymeric material, 1 to 10 weight percent first compound and 90 to 95 weight percent second polymeric material, or 5 to 15 weight percent first compound and 85 to 95 weight percent second polymeric material.

Similarly, because the majority of the weight of the first compound is often attributable to first polymeric group Q, the grafted copolymer often contains at least 0.5 weight percent, at least 1 weight percent, at least 2 weight percent, or at least 5 weight percent group Q based on a total weight of the grafted copolymer. The grafted copolymer can contain, for example, up to 20 weight percent, up to 15 weight percent or up to 10 weight percent of group Q. The concentration of group Q in the grafted copolymer is often in the range of 0.5 to 20 weight percent, 1 to 20 weight percent, 2 to 20 weight percent, 5 to 20 weight percent, 1 to 15 weight percent, 1 to 10 weight percent, or 2 to 10 weight percent based on the total weight of the grafted copolymer.

Some specific grafted copolymers are formed from a second polymeric material that is a viscoelastic material and a first compound that is not miscible with the viscoelastic material at ambient temperatures. The first compound can have a Q polymeric group that is homopolymer such as a poly(vinyl aryl monomer) (e.g., polystyrene), a block copolymer having a first block of poly(vinyl aryl monomer) and a second block of poly(vinyl heterocyclic monomer) (e.g., di-block poly(styrene-co-vinyl pyridine), a random copolymer of a poly(vinyl aryl monomer) and a poly(vinyl heterocyclic monomer) (e.g., random poly(styrene-co-vinyl pyridine). Alternatively, the compound can have a Q polymeric group that is a poly(meth)acrylate such as, for example, poly(benzyl methacrylate), poly(methyl methacrylate), poly(phenoxyethyl acrylate), or poly(isobornyl acrylate-co-benzyl methacrylate) that is either a random or block copolymer. The viscoelastic material can be a polymerized product of a second monomer composition that contains a (meth)acrylic acid and (meth)acrylate ester.

To prepare the grafted copolymer, the second polymeric material is often reacted with the first compound using a hot melt process. The second polymeric material is prepared and then mixed with the first compound. Any suitable hot melt method can be used to mix the first compound with the second polymeric material. In some methods, the second polymeric material is positioned within a packaging material (e.g., the second polymeric material can be prepared within the packaging material) such as a pouch that is combined with the first compound within a mixing device such as one of those commercially available from C. W. Brabender (Hackensack, N.J.) or an extruder. The mixing device can break open the packaging material surrounding the second polymeric material, can melt the packaging material surrounding the second polymeric material, or both.

Any suitable reaction time and temperature can be used that are sufficient to form the grafted copolymer and optionally melt the packaging material. For example, the first compound can be mixed with the second polymeric material at temperatures equal to at least 100° C., at least 110° C., or at least 120° C. for at least 1 minute, at least 2 minutes, at least 5 minutes, at least 10 minutes, or at least 20 minutes. A temperature and time are often selected such that the packaging material melts but insufficient to degrade the first compound, the second polymeric material, or both. The amount of packaging material and the type of packaging material are selected so that desired properties of the grafted compound are not adversely affected by the packaging material.

The grafted copolymer plus any melted packaging material is often delivered as a film or coating using a die. This film or coating is often positioned on one or both major surfaces of a substrate. Any suitable substrate can be used such as those formed from metal-containing materials, polymeric materials, ceramic materials, or glasses. The substrate can be rigid or flexible, clear or opaque, and of any suitable thickness. If the film or coating is a pressure-sensitive adhesive, the substrate can be a backing material. Suitable backings include, but are not limited to, paper, cloth (woven or non-woven), poly(vinyl chloride), polyurethane, polyolefin (e.g., polyethylene, polypropylene, or copolymers thereof), polyesters such as poly(ethylene terephthalate), nylon, polycarbonate, poly(ethylene vinyl acetate), poly(ethylene acrylic acid), foams such as those prepared from polyurethanes or polyacrylates, metal foil, and the like.

In some embodiments, the grafted copolymer is positioned between two substrates. The first substrate can be, for example, a backing suitable for a pressure-sensitive adhesive and the second substrate can be a release liner. Any suitable release liner can be used such as, for example, a backing coated with a silicone coating (silicone release liner), polyfluoropolyether coating, or polyfluoroethylene coating.

Besides being used in adhesive compositions such as pressure-sensitive adhesive compositions, the grafted copolymers can be used to chemically alter various other surfaces and materials. For example, the second compound can be any carboxyl-containing material such as a membrane having carboxyl groups or surface modified with a carboxyl-containing material, inorganic material surface modified with a carboxyl-containing material, fibers having carboxyl groups or surface modified with a carboxyl-containing material, super adsorbant polymers having carboxyl groups, or the like. Reacting these carboxyl-containing material with a compound of Formula (I) can be used to provide a material with an altered contact angle, altered wetability, or altered compatibility with other materials. For example, a hydrophilic surface can be altered to form a hydrophobic surface.

The grafted copolymer can be blended with a polyamide to form a blended composition. The addition of the polyamide can further enhance the cohesive strength of the grafted copolymer. This further enhancement in cohesive strength may be attributable to hydrogen bonding within the polyamide, hydrogen bonding between the polyamide and the grafted copolymer, or both. The cohesive strength of the blended composition (i.e, blend) is typically greater than the cohesive strength of the grafted copolymer alone and greater than the cohesive strength obtained by adding the polyamide to the viscoelastic material used to form the grafted copolymer. The enhanced cohesive strength of the blend is often greater than the sum of the increased cohesive strength obtained by formation of the grafted copolymer from the viscoelastic material and the increased cohesive strength obtained by adding the polyamide to the viscoelastic material used to form the grafted copolymer.

Any suitable polyamide can be used. The polyamide can have aliphatic segments, aromatic segments, or a combination thereof separated by amido groups. The amido groups are usually in the backbone of the polyamide. Suitable polyamides are typically selected 1) to have a melting temperature no greater than 200° C., 2) to be at least partially soluble in the composition at blending temperature, or 3) both 1) and 2).

A first class of polyamides has a melting point no greater than 200° C. Some suitable polyamides have a melting temperature no greater than 190° C., no greater than 180° C., no greater than 170° C., or no greater than 160° C. The melting temperature typically increases with the concentration of amido groups included in the polyamide. Polyamides that have a melting point no greater than 200° C. can be blended with the grafted copolymer by melt processing. That is, both the grafted copolymer and the polyamide can be blended in a molten state at blending temperatures no greater than 200° C. If higher blending temperatures than about 200° C. are used, there is an increased likelihood that the grafted copolymer might undergo at least some degradation. However, blending temperatures greater than 200° C. can be used if the time the materials are at this temperature is relatively short.

Alternatively, the grafted copolymer and the polyamide can be blended at temperatures lower than the melting temperature of the polyamide if the blending temperature is sufficiently high to dissolve the polyamide in the composition to an extent that good mixing results. The polyamide can dissolve in the grafted copolymer, in an inert solvent included in the blended composition, or both.

Suitable polyamides with a melting point no greater than 200° C. can have aromatic segments, aliphatic segments, or a combination thereof. The aliphatic segments can be linear, cyclic, or branched. The aliphatic segments can have carbon backbones or can have heteroatoms included with the carbon atoms in the backbone. The aliphatic segments can be saturated or partially unsaturated. In some embodiments the aliphatic segments are alkylene or heteroalkylene groups.

Some example polyamides with a melting point no greater than 200° C. are polyether-based polyamides. That is, these polyamides have at least one polyether segment (i.e., a heteroalkylene segment having a plurality of groups of formula —(CH$_2$)—O— wherein n is an integer equal to at least 1). The polyether segments are often repeat units of formula —CH$_2$CH$_2$O—, —CH$_2$CH$_2$CH$_2$O—, —CH$_2$CH$_2$CH$_2$CH$_2$O—, or the like. Suitable polyether-based polyamides are often block copolymers and can further include at least one alkylene segment. Specific polyether-based polyamides include, but are not limited to, those commercially available under the trade designation PEBAX (e.g., PEBAX 1205, PEBAX 2533, and PEBAX 6333) from Arkema Inc. (Philadelphia, Pa.).

Other example polyamides with a melting point no greater than 200° C. are dimer acid-based polyamides. Dimer acids are typically formed by the dimerization of unsaturated fatty acids having 18 carbon atoms such as oleic acid or tall oil fatty acid. The dimer acids are often at least partially unsaturated and often contain 36 carbon atoms. The dimer acid-based polyamides are frequently formed using a condensation reaction of dimer acid with a diamine. The diamines are often alkylene diamines or heteroalkylene diamines Specific dimer acid-based polyamides include, but are not limited to, those commercially available under the trade designation MACROMELT (e.g., MACROMELT 6240) from Henkel (Rocky Hill, Conn.).

Still other example polyamides with a melting point no greater than 200° C. are poly(lactams) such as poly(lauryl lactam). There polyamides, which are formed by ring opening reactions, have a plurality of alkylene segments (e.g., such as an alkylenes with 11 carbon atoms) separated by amido groups. An example poly(lactam) is poly(lauryl lactam) that is commercially available under the trade designation NYLON 12 from Scientific Polymer Products, Inc. (Ontario, N.Y.).

Other suitable polyamides are those that can at least partially dissolve in the blended composition at the blending temperature. The melting point for this class of polyamides can be no greater than 200° C. or can be greater than 200° C. When the melting point is not greater than 200° C., they can be blended as discussed above for the first class of polyamides. When the melting temperature of the polyamide is greater than 200° C., the polyamide can be blended with the grafted copolymer at blending temperatures greater than 200° C. provided that combined temperature and time and temperature is selected to minimize or prevent degradation of the grafted copolymer. In yet another method, the grafted copolymer and the polyamide can be blended at temperatures lower than the melting temperature of the polyamide if the blending temperature is sufficiently high to dissolve the polyamide in the composition to an extent that good mixing results. The polyamide can dissolve in the grafted copolymer, in an inert solvent included in the blended composition, or both.

As used herein, the term "partially dissolved" means that at least 50 weight percent, at least 60 weight percent, at least 70 weight percent, at least 80 weight percent, at least 90 weight percent, at least 95 weight percent, at least 98 weight percent, at least 99 weight percent, at least 99.5 weight percent, or at least 99.8 weight percent of the polyamide dissolves at the blending temperatures. In some embodiments, the formation of a transparent blended composition at the blended temperature is desired. The blending temperature is selected based on the particular grafted copolymer (e.g., it is selected to minimize or prevent degradation of the grafted copolymer) and polyamide included in the blended composition. If an inert solvent is present, the blending temperature is often lower than the boiling temperature of the inert solvent. The blending temperature is often in the range of ambient temperature to 300° C., in the range of ambient temperature to 250° C., or in the range of ambient temperature to 200° C.

Polyamides of the second class typically have an aliphatic segment and an arylene segment. The arylene segment often includes phenylene and the aliphatic segment is often an alkylene or heteroalkylene. This type of polyamides can be prepared, for example, by the condensation reaction of terephthalic acid, isophthalic acid, or a combination thereof with an alkylene diamine, heteroalkylene diamine, or combination thereof. Suitable alkylene diamines are often branched or cyclic alkylene groups with 6 to 12 carbon atoms. One example is a polyamide of the following chemical structure where the alkylene group is branched and contains 9 carbon atoms. The variable n is greater than 3, greater than 10, greater than 20, or greater than 50.

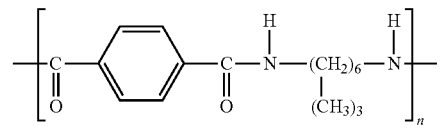

Such a polyamide is commercially available under the trade designation TROGAMID (e.g., TROGAMID T) from Evonik Degussa Corporation (Parsippany, N.Y.). Similar polyamides are commercially available from other suppliers such as Scientific Polymer Products, Inc. (Ontario, N.Y.) under the trade designation NYLON 6(3)T.

Suitable polyamides can have any molecular weight that allows mixing with the grafted copolymer. Although the particular molecular weight that is suitable can be dependent upon the chemical composition of the polyamide, the number average molecular weight is often at least 10,000 grams/mole, at least 20,000 grams/mole, or at least 50,000 grams/mole. The number average molecular weight can be up to 500,000 grams/mole or even higher. For example, the number average molecular weight can be up to 400,000 grams/mole, up to 300,000 grams/mole, up to 200,000 grams/mole, or up to 100,000 grams/mole. In some examples, the number average molecular weight is in the range of 10,000 to 500,000 grams/mole, in the range of 50,000 to 500,000 grams/mole, or in the range of 50,000 to 300,000 grams/mole.

The blended composition (e.g., grafted copolymer and polyamide) typically has a higher cohesive strength than the grafted copolymer alone. This enhanced cohesive strength may be attributable to hydrogen bonding between the amido groups of the polyamide and various polar groups of the grafted copolymer, to hydrogen bonding within the polyamide itself, or to a combination thereof. These bonds often can be disrupted at elevated temperatures (e.g., 100° C. to 200° C.) allowing the coating of the blending compositions. Upon cooling to room temperature, however, the hydrogen bonds form again to provide the enhanced cohesive strength. The increase in cohesive strength is roughly proportional to the amount of polyamide included in the blended composition.

As more polyamide is added to the blended composition, the modulus and glass transition temperature of the composition can increase. If the blended composition is to be used as an adhesive composition such as a pressure-sensitive adhesive composition, the amount of polyamide in the blend is typically no greater than 20 weight percent based on a total weight of the blended composition. If the amount of polyamide is higher, the blended composition might not have the usual characteristics of pressure-sensitive adhesives. That is, the glass transition temperature, the modulus, or both may both increase to the point that the composition no longer functions as a pressure-sensitive adhesive.

The blended composition (i.e., blend) often includes 0.5 to 20 weight percent polyamide and 80 to 99.5 weight percent grafted copolymer based on the total weight of the blended composition. Some blends contain 1 to 20 weight percent polyamide and 80 to 99 weight percent grafted copolymer, 2 to 20 weight percent polyamide and 80 to 98 weight percent grafted copolymer, 1 to 15 weight percent polyamide and 85 to 99 weight percent grafted copolymer, 2 to 15 weight percent polyamide and 85 to 98 weight percent grafted copolymer, 1 to 10 weight percent polyamide and 90 to 99 weight percent grafted copolymer, 2 to 10 weight percent polyamide and 90 to 98 weight percent grafted copolymer, or 5 to 10 weight percent polyamide and 90 to 95 weight percent grafted copolymer.

The polyamide can be blended with the grafted copolymer after formation of the grafted copolymer. Alternatively, the polyamide can be blended with the first compound of Formula (I) and with the second polymeric material. Stated differently, the grafted copolymer can be formed in the presence of the polyamide. In many embodiments, the grafted copolymer is formed and blended with the polyamide using a hot melt process. Any suitable hot melt method can be used to prepare the grafted copolymer and to blend the resulting grafted copolymer with the polyamide. In some methods, the second polymeric material is positioned within a packaging material (e.g., the second polymeric material can be prepared within the packaging material) such as a polymeric pouch that is combined with the first compound within a mixing device such as those commercially available from C. W. Brabender (Hackensack, N.J.) or an extruder. The mixing device can break open the packaging material surrounding the second polymeric material, melt the packaging material surrounding the second polymeric material, or both. Once the package is broken, the second polymeric material reacts with the first compound forming the grafted copolymer. The resulting grafted copolymer is then blended with the polyamide.

The temperature selected for the hot melt process is typically no greater than 200° C. The temperature is typically selected to be sufficiently high to react the first compound with the second polymeric material and to form a molten grafted copolymer. Higher temperatures can be used if the combination of time and temperature is selected to prevent or minimize degradation of the grafted copolymer. The grafted copolymer is then mixed with the polyamide while the grafted copolymer is in a molten state. The temperature is typically selected so that the polyamide is also molten or sufficiently dissolved so as to adequately mix with the grafted copolymer.

The blended composition is often delivered as a film or coating using a die. This film or coating is often positioned on one or both major surfaces of a substrate. Any suitable substrate can be used such as those formed from metal-containing materials, polymeric materials, ceramic materials, or glasses. The substrate can be rigid or flexible, clear or opaque, and of any suitable thickness. If the film or coating is a pressure-sensitive adhesive, the substrate can be a backing material. Suitable backings include, but are not limited to, paper, cloth (woven or non-woven), poly(vinyl chloride), polyurethane, polyolefin (e.g., polyethylene, polypropylene, or copolymers thereof), polyesters such as poly(ethylene terephthalate), nylon, polycarbonate, poly(ethylene vinyl acetate), poly(ethylene acrylic acid), foams such as those prepared from polyurethanes or polyacrylates, metal foil, and the like.

In some embodiments, the blended composition is positioned between two substrates. The first substrate can be, for example, a backing suitable for a pressure-sensitive adhesive and the second substrate can be a release liner. Any suitable release liner can be used such as, for example, a backing coated with a silicone coating (silicone release liner), polyfluorpolyether coating, or polyfluoroethylene coating.

The blended composition can have both physical crosslinking and hydrogen bonding to provide cohesive strength. While physical crosslinking relies on phase separation within the grafted copolymer, hydrogen bonding does not depend on phase separation. Rather, hydrogen bonding relies on the interaction of the amido groups on the polyamide with various polar groups on the grafted copolymer, with various other polar groups within the polyamide, or both. These two approaches for improving the cohesive strength result in a cooperative or synergistic effect. That is, the enhanced cohesive strength is greater than the summation of the enhancement obtained using hydrogen bonding alone and the enhancement obtained using physical crosslinking alone.

The blended compositions can be fluid at elevated temperatures and then physically crosslink and hydrogen bonded when cooled to room temperature. This type of crosslinking and bonding can be reversible. That is, the blended composition can be repeatedly heated to a fluid or molten state and cooled again. The physical crosslinking and hydrogen bonding can reform repetitively upon cooling from the fluid or molten state.

No additional crosslinking (e.g., chemical crosslinking, photocrosslinking or electron beam crosslinking) is needed to achieve the desired cohesive strength. This is particularly advantageous because the cohesive strength can be achieved without the typical problems associated with photocrosslinking and electron beam crosslinking techniques such as a limited depth of radiation penetration, significant capital investment, line speed limitations, and high additive loadings.

Furthermore, the combined used of both physical crosslinking and hydrogen bonding allows the use of a second polymeric material with low acid content in the formation of the grafted copolymer. In these systems, the use of either physical crosslinking or hydrogen bonding alone is typically inadequate to provide the desired cohesive strength. The combination of physical crosslinking and hydrogen bonding can result in the formation of blended compositions with good cohesive strength. These systems are often desirable for medical and electronic applications.

The grafted copolymer or the blended composition is often used as an adhesive. As such, the grafted compound or the blended composition is often tacky and can be used as a pressure-sensitive adhesive. If more tackiness is desired, however, additional tackifiers can be mixed with the grafted compound. Any tackifier typically included in pressure-sensitive adhesive compositions can be used. Either solid or liquid tackifiers can be added. Solid tackifiers generally have a number average molecular weight (Mn) no greater than about 10,000 grams/mole and a softening point above about 70° C. Liquid tackifiers are viscous materials that have a softening point of about 0° C. to about 70° C. Solid tackifying resins are generally preferred.

Suitable tackifying resins include rosins and their derivatives (e.g., rosin esters); polyterpenes and aromatic-modified polyterpene resins; coumarone-indene resins; and hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. These tackifying resins, if desired, can be hydrogenated to lower their color contribution to the pressure-sensitive adhesive layer. In some embodiments, the tackifier is selected to be miscible with the viscoelastic material used to form the grafted copolymer but not with the polymeric group Q in the grafted copolymer.

When a tackifier is added to the grafted copolymer or the blended composition, the composition often contains 0.5 to 50 weight percent tackifier based on the total weight of the blend (e.g., weight of tackifier, grafted copolymer, and polyamide). In some embodiments, the blended composition contains 1 to 50 weight percent, 1 to 40 weight percent, 5 to 40 weight percent, 1 to 30 weight percent, 5 to 30 weight percent, 1 to 20 weight percent, or 5 to 20 weight percent tackifier.

Some compositions with a tackifier can include, for example, 50 to 99.5 weight percent grafted copolymer and 0.5 to 50 weight percent tackifier, 50 to 99 weight percent grafted copolymer and 1 to 50 weight percent tackifier, 60 to 99 weight percent grafted copolymer and 1 to 40 weight percent tackifier, 60 to 95 weight percent grafted copolymer and 5 to 40 weight percent tackifier, 70 to 95 weight percent grafted copolymer and 5 to 30 weight percent tackifier, or 80 to 95 weight percent grafted copolymer and 5 to 20 weight percent tackifier.

The blended compositions that include tackifier can contain 1 to 50 weight percent tackifier, 30 to 98.8 weight percent grafted copolymer, and 0.2 to 20 weight percent polyamide based on a total weight of the blended composition. Some examples contain 1 to 40 weight percent tackifier, 40 to 98.5 weight percent grafted copolymer, and 0.5 to 20 weight percent polyamide. Other examples contain 1 to 30 weight percent tackifier, 50 to 98 weight percent grafted copolymer, and 1 to 20 weight percent polyamide. Still other examples contain 1 to 30 weight percent tackifier, 60 to 98 weight percent grafted copolymer, and 1 to 10 weight percent polyamide.

Other materials such as fillers, plasticizers, antioxidants, UV stabilizers, and the like can be added to any of the compositions containing the grafted compound.

Various items are provided that include an oxazolinyl-containing compound, a method of making the oxazolinyl-containing compound, a reaction mixture that includes the oxazolinyl-containing compound and a second compound having at least one acidic group, a grafted copolymer, a method of making the grafted copolymer, a blended composition of the grafted copolymer with a polyamide, and method of making the blended composition.

Item 1 is a compound of Formula (I).

$$R^1\text{-}\underset{R^1}{\overset{R^1}{\text{oxazoline ring}}}\text{-}R^2\text{-}\underset{}{\overset{O}{\overset{\|}{C}}}\text{-}\underset{}{\overset{H}{\overset{|}{N}}}\text{-}\underset{R^1}{\overset{R^1}{\overset{|}{C}}}\text{-}\underset{R^1}{\overset{R^1}{\overset{|}{C}}}\text{-}O\text{-}\underset{}{\overset{O}{\overset{\|}{C}}}\text{-}Q \quad (I)$$

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer.

Item 2 is the compound of item 1, wherein the group Q has a weight average molecular weight equal to at least 5000 grams/mole.

Item 3 is the compound of item 1 or 2, wherein the compound has a glass transition temperature equal to at least 20° C.

Item 4 is the compound of any one of items 1 to 3, wherein group Q is formed by a free radical polymerization reaction.

Item 5 is the compound of any one of items 1 to 4, wherein the monomer composition comprises a vinyl aryl monomer, vinyl heterocyclic monomer, or a combination thereof.

Item 6 is the compound of item 5, wherein the monomer composition comprises styrene, alpha-methyl styrene, or an alkyl substituted styrene.

Item 7 is the compound of any one of items 1 to 4, wherein the monomer composition comprises a (meth)acrylate ester, (meth)acrylamide, or a combination thereof.

Item 8 is the compound of item 7, wherein the (meth)acrylate ester comprises methyl methacrylate, ethyl methacrylate, cycloalkyl (meth)acrylate, bicyclic (meth)acrylate, aryl (meth)acrylate, aryloxyalkyl (meth)acrylate, or a combination thereof.

Item 9 is the compound of any one of items 1 to 8, wherein the group Q is a homopolymer.

Item 10 is the compound of any one of items 1 to 8, wherein group Q is a random copolymer.

Item 11 is the compound of item 10, wherein the random copolymer is formed from a monomer composition comprising a vinyl aryl monomer and a vinyl heterocyclic monomer.

Item 12 is the compound of item 11, wherein the vinyl aryl monomer is styrene and the vinyl heterocyclic monomer is 4-vinylpyridine.

Item 13 is the compound of any one of items 1 to 8, wherein the group Q is block copolymer.

Item 14 is the compound of any one of items 1 to 8, wherein the group Q is a diblock copolymer.

Item 15 is the compound of item 14, wherein the diblock copolymer comprises a first block of poly(vinyl aryl monomer) and a second block of poly(vinyl heterocyclic monomer).

Item 16 is the compound of item 15, wherein the poly(vinyl aryl monomer) is polystyrene and the poly(vinyl heterocyclic monomer) is poly(4-vinylpyridine).

Item 17 is the compound of any one of items 1 to 16, wherein $R^2$ is phenylene.

Item 18 is the compound of any one of items 1 to 16, wherein $R^2$ is an alkylene or a single bond.

Item 19 is the compound of any one of items 1 to 16, wherein $R^2$ is a heteroalkylene.

Item 20 is a method of making a compound of Formula (I).

$$R^1\text{-}\underset{R^1}{\overset{R^1}{\text{oxazoline ring}}}\text{-}R^2\text{-}\underset{}{\overset{O}{\overset{\|}{C}}}\text{-}\underset{}{\overset{H}{\overset{|}{N}}}\text{-}\underset{R^1}{\overset{R^1}{\overset{|}{C}}}\text{-}\underset{R^1}{\overset{R^1}{\overset{|}{C}}}\text{-}O\text{-}\underset{}{\overset{O}{\overset{\|}{C}}}\text{-}Q \quad (I)$$

The method includes providing a carboxyl-terminated polymer of Formula (III)

$$Q\text{-}(CO)\text{-}OH \quad (III)$$

wherein Q is a polymeric group comprising a product of polymerization of a first monomer composition comprising at least one ethylenically unsaturated monomer. The method further includes reacting the carboxyl-terminated polymer with a bis-oxazoline compound of Formula (IV).

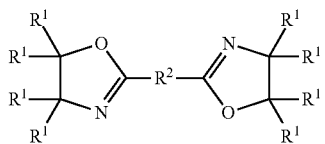

(IV)

In Formula (IV), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl.

Item 21 is the method of item 20, wherein the carboxyl-terminated polymer has a weight average molecular weight equal to at least 5000 grams/mole.

Item 22 is the method of item 20 or 21, wherein the carboxyl-terminated polymer has a glass transition temperature equal to at least 20° C.

Item 23 is the method of any one of items 20 to 22, wherein the carboxyl-terminated polymer is formed by a free radical polymerization reaction.

Item 24 is the method of claim 23, wherein the carboxyl group of the carboxyl-terminated polymer is formed from an initiator, chain transfer agent, or nitroxide meditating agent used in the free radical polymerization reaction.

Item 25 is a reaction mixture a) a first compound of Formula (I) and b) a second compound having at least one acidic group.

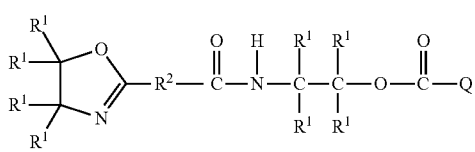

(I)

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer.

Item 26 is the reaction mixture of item 25, wherein the second compound is a second polymeric material having multiple acidic groups.

Item 27 is the reaction mixture of item 25 or 26, wherein the second compound is a second polymeric material having multiple carboxyl groups.

Item 28 is the reaction mixture of any one of items 25 to 27, wherein the second compound is a polymerized product of a second monomer composition comprising (a) (meth)acrylic acid and (b) at least one (meth)acrylate ester.

Item 29 is the reaction mixture of any one of items 25 to 28, wherein Q is has a weight average molecular weight greater than 5000 grams/mole.

Item 30 is the reaction mixture of any one of items 25 to 29, wherein the at least one ethylenically unsaturated monomer used to form Q is selected to have a glass transition temperature equal to at least 20° C. when polymerized as a homopolymer.

Item 31 is the reaction mixture of any one of items 25 to 30, wherein the first monomer composition comprises styrene, alpha-methyl styrene, or an alkyl substituted styrene.

Item 32 is the reaction mixture of any one of items 25 to 30, wherein the first monomer composition comprises a (meth)acrylate ester, (meth)acrylamide, or a combination thereof.

Item 33 is the reaction mixture of any one items 25 to 30, wherein the group Q is a random copolymer and the first monomer composition comprises a vinyl aryl monomer and a vinyl heterocyclic monomer.

Item 34 is the reaction mixture of any one of items 25 to 30, wherein the group Q is a block copolymer comprising a first block of poly(vinyl aryl monomer) and a second block of poly(vinyl heterocyclic monomer).

Item 35 is the reaction mixture of any one of items 25 to 34, wherein the reaction mixture further comprises a polyamide.

Item 36 is a grafted copolymer comprising a product of a reaction mixture comprising a) a first compound of Formula (I) and b) a second polymeric material having at least one acidic group.

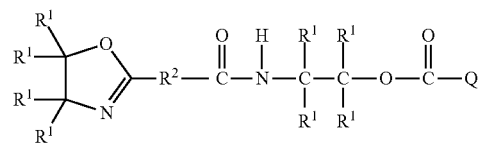

(I)

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer.

Item 37 is the grafted copolymer of claim 36, wherein the second polymeric material is a viscoelastic material prepared from a second monomer composition comprising (a) (meth)acrylic acid and (b) at least one (meth)acrylate ester.

Item 38 is the grafted copolymer of item 36 or 37, wherein group Q has a weight average molecular weight greater than 5000 grams/mole.

Item 39 is the grafted copolymer of any one of items 36 to 38, wherein the at least one ethylenically unsaturated monomer used to form group Q is selected to have a glass transition temperature equal to at least 20° C. when polymerized as a homopolymer.

Item 40 is the grafted copolymer of any one of items 36 to 39, wherein the grafted copolymer has a plurality of pendant groups of formula —(CO)OC($R^1$)$_2$C($R^1$)$_2$NH—(CO)—$R^2$—(CO)—NH—C($R^1$)$_2$C($R^1$)$_2$—O(CO)-Q.

Item 41 is the grafted copolymer of any one of items 36 to 40, wherein the group Q is phase separated from the second polymeric material.

Item 42 is a method of making a grafted copolymer. The method includes forming a reaction mixture comprising 1) a first compound of Formula (I) and 2) a second polymeric material having at least one acidic group.

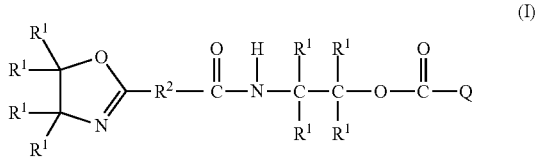

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer. The method further includes reacting an oxazolinyl group of the first compound with at least one acidic group of the second polymeric material to form the grafted copolymer.

Item 43 is a composition that comprises a) a grafted copolymer and b) a polyamide blended with the grafted copolymer, wherein the polyamide is selected 1) to have a melting temperature no greater than 200° C., 2) to be at least partially soluble in the composition at blending temperature, or 3) both 1) and 2). The grafted copolymer comprises a product of a reaction mixture comprising 1) a first compound of Formula (I) and 2) a second polymeric material having at least one acidic group.

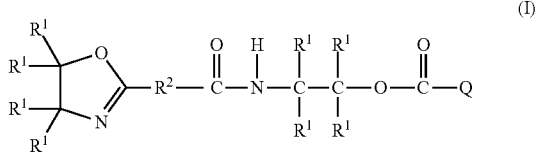

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer.

Item 44 is the composition of item 43, wherein the composition is an adhesive.

Item 45 is the composition of item 43 or 44, wherein the composition is a pressure-sensitive adhesive.

Item 46 is the composition of any one of items 43 to 45, wherein the composition is hot melt processable.

Item 47 is the composition of any one of items 43 to 46, wherein the amido groups of the polyamide hydrogen bond with polar groups in the grafted copolymer, with other polar groups in the polyamide, or a combination thereof.

Item 48 is the composition of any one of items 43 to 47, wherein the polyamide is present in an amount in a range of 0.5 to 20 weight percent based on a total weight of the composition.

Item 49 is the composition of any one of items 43 to 48, wherein the polyamide is a block copolymer having at least one polyether segment.

Item 50 is the composition of any one of items 43 to 49, wherein the polyamide is a block copolymer having (a) at least one polyether segment and (b) at least one alkylene segment.

Item 51 is the composition of any one of items 43 to 49, wherein the polyamide is a block copolymer having (a) at least one aliphatic segment and (b) at least one arylene segment.

Item 52 is the composition of any one of items 43 to 49, wherein the polyamide is prepared from reaction mixture comprising (a) an alkylene diamine, heteroalkylene diamine, or a combination thereof and (b) terephthalic acid, isophthalic acid, or a combination thereof.

Item 53 is the composition of any one of items 43 to 49, wherein the polyamide comprises (a) at least one alkylene or heteroalkylene segment and (b) at least one phenylene segment.

Item 54 is the composition of any one of items 43 to 49, wherein the polyamide is prepared from reaction mixture comprising (a) an aliphatic diamine and (b) a dimer acid.

Item 55 is the composition of any one of items 43 to 54, wherein the second polymeric material is a polymerized product of a second monomer composition comprising (a) (meth)acrylic acid and (b) at least one (meth)acrylate ester.

Item 56 is the composition of any one of items 44 to 55, wherein group Q of the grafted copolymer phase separates from a portion of the grafted copolymer derived from the second polymeric material.

Item 57 is the composition of any one of items 43 to 56, wherein the at least one ethylenically unsaturated monomer used to form Q is selected to have a glass transition temperature equal to at least 20° C. when polymerized as a homopolymer.

Item 58 is the composition of any one of items 43 to 57, wherein Q is has a weight average molecular weight greater than 5000 grams/mole.

Item 59 is the composition of any one of items 43 to 58, wherein the first monomer composition comprises styrene, alpha-methyl styrene, or an alkyl substituted styrene.

Item 60 is the composition of any one of items 43 to 58, wherein the first monomer composition comprises a (meth)acrylate ester, (meth)acrylamide, or a combination thereof.

Item 61 is the composition of any one items 43 to 58, wherein the group Q is a random copolymer and the first monomer composition comprises a vinyl aryl monomer and a vinyl heterocyclic monomer.

Item 62 is the composition of any one of items 43 to 58, wherein the group Q is a block copolymer and the first monomer composition comprises a first block of poly(vinyl aryl monomer) and a second block of poly(vinyl heterocyclic monomer).

Item 63 is a method of making a composition. The method includes providing a grafted copolymer comprising a product of a reaction mixture comprising 1) a first compound of Formula (I) and 2) a second compound comprising a viscoelastic material having at least one acidic group.

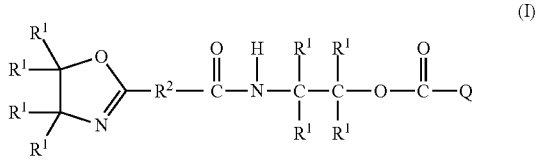

(I)

In Formula (I), each $R^1$ is independently hydrogen, alkyl, aryl, or aralkyl. The $R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof. Group $R^3$ is hydrogen or an alkyl. Group Q is a polymeric group that is a polymerized product of a monomer composition that includes at least one ethylenically unsaturated monomer. The method further includes blending the grafted copolymer with a polyamide, wherein the polyamide is selected 1) to have a melting temperature no greater than 200° C., 2) to be at least partially soluble in the composition at blending temperature, or 3) both 1) and 2).

Item 64 is the method of item 63, wherein the grafted copolymer is formed in the presence of the polyamide.

Item 65 is the method of items 63 or 64, wherein the grafted copolymer and the blended composition is solvent free or substantially solvent free.

EXAMPLES

All percents are based on weight unless otherwise indicated.

The materials used in the following examples were purchased from Alfa Aesar (Ward Hill, Mass.) or Sigma-Aldrich Company (St. Louis, Mo.) unless otherwise stated.

Inhibitor removal from the monomers was done by passing the monomers through a column packed with Inhibitor Removal Resin (CAS #9003-70-7) from Alpha Aesar (Ward Hill, Mass.). Monomers treated in this manner are referred to as "treated monomers".

Test Method for Molecular Weight Distribution

The molecular weight distribution of the compounds was characterized using conventional gel permeation chromatography (GPC). The GPC instrumentation, which was obtained from Waters Corporation (Milford, Mass.), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif.).

Samples of polymeric solutions were prepared by dissolving polymer or dried polymer samples in tetrahydrofuran at a concentration of 0.5 percent (weight/volume) and filtering through a 0.2 micron polytetrafluoroethylene filter that is available from VWR International (West Chester, Pa.). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Test Method for Shear Strength at Room Temperature

Shear tests were conducted using 25.4 mm wide adhesive tapes prepared in the examples. A stainless steel panel was cleaned by wiping with acetone and drying. Tapes were applied to the panel such that a 25.4 mm by 25.4 mm portion of each adhesive tape was in firm contact with the panel and one end portion of each tape free. The panel with tape was held in a rack so that the panel formed an angle of 180° with the extended free end and a one kilogram weight was attached to the free end. The test was conducted at room temperature (approximately 23° C.) and the time elapsed for each tape to separate from the test panel was recorded as the shear strength in minutes. Two shear tests were performed for each sample adhesive and the results averaged.

Test Method for Peel Adhesion Force

Peel adhesion force was measured using tapes prepared in the example. A stainless steel panel was cleaned by wiping with acetone and drying. Tapes measuring 1.25 cm wide by 10-12 cm long were adhered to the panel by rolling with a 2 kg hard rubber roller 2 times. The free end of the adhesive strip was doubled back so that the angle of removal was 180°, and attached to the horizontal arm of an adhesion tester scale (Slip/peel tester model 3M90, obtained from Instrumentors Inc. Strongsville, Ohio). The stainless steel plate was attached to the platform that moved at 12"/min. (30.5 cm/min.) away from the scale. The peel test was started soon after the tape was applied to the test panel without allowing time for adhesion to build. The scale was read in Newtons during the test as an average of the peak and minimum forces during the peel. Three peel tests were run for each sample and averaged to yield the peel force value.

Example 1

Preparation of Oxazolinyl-Terminated Polystyrene Polymer

A carboxyl-terminated polystyrene polymer was prepared by adding 300 grams of treated styrene monomer, 7 grams of 4,4' azobis(4-cyanovaleric acid) initiator, 2.25 grams of 2,2,6,6-tetramethyl-1-piperidinyloxy (TEMPO), and 60 grams of xylene solvent to a 1000 milliliter (mL) multi-neck flask that was fitted with a condenser, mechanical stirrer, and nitrogen purge line. The flask was sealed with a rubber septum, mixed, and then bubbled with nitrogen for 30 minutes. The flask was then placed in an oil bath at 145° C. and held at that temperature for 10 hours while stirring. During the reaction, the initially red solution changed to a light yellowish color and the solid initiator dissolved. The product was cooled and a sample was taken for both GPC and H-NMR analysis. Based on GPC analysis, the conversion of styrene monomer was approximately 81 percent and the weight average molecular weight (Mw) of the polymer was approximately 18,000 grams/mole with a polydispersity of 1.3. The product was then slowly added to 6 fold (by volume) excess of cold methanol. The precipitated carboxyl-terminated polystyrene polymer was filtered, collected, and dried under vacuum.

A bisoxazoline solution was prepared by dissolving 7.0 grams of 1,3-bis(4,5-dihydro-2-oxazolyl)benzene in 50 grams of toluene. A solution containing 100 grams of the carboxyl-terminated polystyrene polymer dissolved in 100 grams of toluene was added to the bisoxazoline solution. This mixture was heated to 60° C. and then stirred for 18 hours at this temperature. The resulting solution was slowly added to 6 fold (by volume) excess of cold methanol. The precipitated oxazolinyl-terminated polystyrene, was filtered, collected, and dried under vacuum. Based on GPC analysis, the weight average molecular weight of the oxazolinyl-terminated poly(styrene)polymer was approximately 18,100 grams/mole with a polydispersity index of 1.30.

Example 2

Oxazolinyl-Terminated Poly(Methyl Methacrylate)

A carboxyl-terminated poly(methyl methacrylate) polymer was prepared by adding 61.6 grams of methyl methacrylate (MMA), 0.825 grams of 3-mercaptopropionic acid (MPA), 0.605 grams of thermal initiator (4,4' azobis(4-cyanovaleric acid)), 55 grams of toluene, and 6.16 grams of ethyl acetate to a narrow necked glass bottle containing a magnetic stir bar, mixing well, and then bubbling with nitrogen for 30 minutes. The bottle was then sealed and placed in a rotating and heated water bath at 70° C. for 24 hours. The water bath was sold under the trade designation LAUNDER-O-METER by Atlas, Inc. (Athens, Ga.). The resulting solution was slowly added to 6 fold (by volume) excess of cold methanol. The precipitated carboxyl-terminated poly(methyl methacrylate) polymer was filtered, collected, and dried under vacuum. Based on GPC analysis, the weight average molecular weight of the carboxyl-terminated poly(MMA) product was approximately 15,080 grams/mole with a polydispersity index of 1.46.

An oxazolinyl-terminated poly(methyl methacrylate) was prepared according to the procedure in Example 1 except using 100 grams of the carboxyl-terminated poly(methyl methacrylate) was dissolved in 100 grams of toluene. The weight average molecular weight of the oxazolinyl-terminated poly(methyl methacrylate) product was approximately 15,400 grams/mole with a polydispersity index of 1.50.

Example 3

Oxazolinyl-Terminated Poly(Benzyl Methacrylate)

A carboxyl-terminated poly(benzyl methacrylate) polymer (poly(BMA)) was prepared according to the procedure in Example 2 except that 53.9 grams of benzyl methacrylate (BMA), 0.413 grams of 3-mercaptopropionic acid (MPA), 0.303 grams of thermal initiator 4,4' azobis-(4-cyanovaleric acid), 48.5 grams of toluene, and 5.39 grams of ethyl acetate were added to a narrow necked glass bottle. The weight average molecular weight of the carboxyl-terminated poly (BMA) product was approximately 20,380 grams/mole with a polydispersity index of 1.82.

An oxazolinyl-terminated poly(benzyl methacrylate) was prepared by dissolving 5.3 grams of 1,3-bis(4,5-dihydro-2-oxazolyl)benzene in 50 grams of toluene. This solution was then combined with a solution containing 100 grams of the carboxyl-terminated poly(BMA) polymer dissolved in 100 grams of toluene and reacting according to the procedure described in Example 1. The weight average molecular weight of the oxazolinyl-terminated poly(benzyl methacrylate) product was approximately 20,400 grams/mole with a polydispersity index of 1.80.

Example 4

Oxazolinyl-Terminated Poly(Styrene-Co-Vinyl Pyridine) Copolymer

A carboxyl-terminated poly(styrene-co-vinyl pyridine) block copolymer was prepared by adding 75 grams of treated styrene monomer, 2 grams of 4,4' azobis(4-cyanovaleric acid), 0.465 grams of 2,2,6,6-tetramethyl-1-piperidinyloxy, and 19 grams of xylene solvent to a 250 mL flask with a magnetic stir bar. The flask was sealed with a rubber septum, mixed well, and bubbled with nitrogen for 20 minutes. The flask was then transferred to an oil bath at 135° C. and held at that temperature for 10 hours. During the reaction, the initially red monomer formulation changed to a light yellowish color. After 10 hours, 11 grams of treated vinyl pyridine was placed in a sealed container and bubbled with nitrogen for 20 minutes. The vinyl pyridine was transferred to the 250 mL flask with the polystyrene solution and the reaction was allowed to continue for 5 additional hours. The resulting polymer solution was cooled and slowly added to a 6 fold (by volume) excess of cold methanol. The precipitated carboxyl-terminated poly(styrene-co-vinyl pyridine) polymer was filtered, collected, and dried under vacuum. The weight average molecular weight of the carboxyl-terminated poly(styrene-co-vinyl pyridine) product was approximately 22,060 grams/mole with a polydispersity index of 1.33.

An oxazolinyl-terminated poly(styrene-co-vinyl pyridine) copolymer was prepared according to the procedure described in Example 1 except the bisoxazoline solution was prepared by dissolving 5.0 grams of 1,3-bis(4,5-dihydro-2-oxazolyl)benzene in 50 grams of toluene and a solution containing 100 grams of the carboxyl-terminated polystyrene polymer dissolved in 100 grams of toluene was added to the bisoxazoline solution. The weight average molecular weight of the oxazolinyl-terminated poly(styrene-co-vinyl pyridine) product was approximately 22,100 grams/mole with a polydispersity index of 1.35.

Preparatory Examples P1-P3

Preparation of Viscoelastic Material

Monomer compositions were prepared by mixing the amounts of isooctyl acrylate (IOA) and acrylic acid (AA) shown in Table 1 with 0.004 grams isooctylthioglycolate (IOTG) and 0.02 grams 2-dimethoxy-2-phenylacetophenone (commercially available under the trade designation IRGACURE 651 from Ciba Specialty Chemicals (Tarrytown, N.Y.)) in an amber bottle.

Pouches were prepared by heat sealing 0.065 millimeter (mm) thick clear poly(ethylene vinyl acetate) film that was obtained under the trade designation VA-24 from Flint Hills Resources (Wichita, Kans.). Open ended pouches measuring 18 centimeters (cm) by 5 cm pouch and weighing about 1.4 grams each were formed. Each pouch was filled with approximately 26 grams of the monomer composition. Air was forced out of the open end of the pouches and then the open ends were sealed. Pouches were sealed using a Midwest Pacific Impulse Sealer commercially available from J.J. Elemer Corporation (St. Louis, Mo.).

The sealed pouches were immersed in a constant temperature water bath at 17° C. and irradiated with ultraviolet light (365 nm, 4 mW/cm$^2$) for eight minutes on each side to polymerize the monomer compositions. The resulting products were viscoelastic material. The molecular weight was determined by dissolving the viscoelastic material in tetrahydrofuran and analyzing by gel permeation chromatography.

TABLE 1

Viscoelastic material compositions

| Example | IOA (grams/wt %) | AA (grams/wt %) | Approx. MW (grams/mole) |
|---|---|---|---|
| P1 | 24.4/94 | 1.6/6 | 1,000,000 |
| P2 | 25.0/96 | 1.0/4 | 1,000,000 |
| P3 | 25.5/98 | 0.5/2 | 1,000,000 |

Examples 5-12

Preparation of Grafted Copolymer

Pouches of the viscoelastic materials P1-P3 as indicated in Table 2 below were melt mixed using a high temperature compounder commercially available under the trade designation BRABENDER (Half Size Mixer) from C. W. Brabender (Hackensack, N.J.). Each pouch was mixed for 5 minutes at 100 revolutions per minute (rpm) with the temperature set at 150° C. When the viscoelastic materials appeared uniformly melted, an oxazolinyl-terminated polymer from Examples 1-4 (EX1-EX4) as indicated in Table 2 was slowly added and allowed to mix at 100 rpm for 20 minutes at 150° C. The mixing chamber was then cooled to 100° C. and the rotation of the mixing paddles was reversed to expel and collect adhesive.

After cooling, approximately 1 gram of the grafted copolymer was placed between a primed PET liner (HOSTAPHEN 3SAB, obtained from Mitsubishi (Greer, S.C.)) and a silicone treated release liner (SILPHAN S36, from Siliconature SPA (Godega di Sant'Urbano, Italy)). This construction was placed between the plates of a heated press from Carver, Inc. (Wabash, Ind.) with plate temperatures set at 80° C. and compressed to a thickness of about 0.05 millimeters (mm). After cooling, test strips were prepared and tested for peel adhesion and shear testing as described in the Test Methods. The adhesive properties are shown in Table 2 for each example.

TABLE 2

Grafted copolymer compositions and adhesive properties

| Example | Viscoelastic Material/Grams | Oxazolinyl-terminated Polymer/Grams | Shear Strength (Minutes) | Peel Force (N/dm) |
|---|---|---|---|---|
| 5 | P1/25 | EX1/2.4 | +10,000 | 11 |
| 6 | P1/25 | EX1/1.8 | +10,000 | 18 |
| 7 | P1/25 | EX1/1.2 | 4,030 | 28 |
| 8 | P1/25 | EX2/1.8 | 330 | 47 |
| 9 | P1/25 | EX3/1.8 | +10,000 | 23 |
| 10 | P1/25 | EX4/1.8 | 1,300 | 47 |
| 11 | P2/25 | EX1/1.8 | +10,000 | 22 |
| 12 | P3/25 | EX1/1.8 | 84 | 42 |

Examples 13-24

Blended Compositions Containing a Grafted Copolymer

Various blended compositions were prepared as described in Examples 5-12 using the materials shown in Table 3. For each example, the pouches of viscoelastic material (P1 or P2) were mixed for 5 minutes at 100 rpm with the temperature set at 150° C. When the viscoelastic materials appeared uniformly melted, the oxazolinyl-terminated polymers was slowly added and allowed to mix at 100 rpm for 2 minutes at 150° C. Additional polyamide or tackifier resins were then added to the mixer and allowed to mix at 150° C. for 18 minutes before expelling the adhesive from the compounder. The particular composition is identified in Table 3 below. Examples 13-17 and 23-24 were blends of a grafted copolymer and a polyamide. Examples 18-22 were blends of a grafted copolymer and a tackifier.

As used herein, the term "P1205" refers to a polyamide that is commercially available under the trade designation PEBAX 1205 from Arkema, Inc. (Colombes, France). This material is a polyether-based polyamide with a melting temperature of 147° C.

The term "M6240" refers to a polyamide that is commercially available under the trade designation MACROMELT 6240 from Henkel (Dusseldorf, Germany). This material is a dimer acid-based polyamide with a melting temperature of 141° C.

The term "N6(3)T" refers to a nylon that is commercially available under the trade designation NYLON 6(3)T from Scientific Polymer Products Inc (Ontario, N.Y.). This material is a block copolymer of terephthalic acid and an alkylene diamine. This material has a melting temperature of 250° C.

The term "N12" refers to a poly(lauryl lactam) based polyamide that is commercially available under the trade designation NYLON 12 from Scientific Polymer Products Inc (Ontario, N.Y.). This material has a melting/softening temperature of 178° C.

The term "R6108" refers to a tackifier that is a partially hydrogenated hydrocarbon resin commercially available under the trade designation REGALREZ 6108 from Eastman Chemical Co. (Kinsgport Tenn.).

The term "ES 5400" refers to a tackifier that is a cycloaliphatic hydrocarbon resin commercially available under the trade designation ESCOREZ 5400 from ExxonMobil Chemical Co. (Houston, Tex.).

The term "ES 1310" refers to a tackifier that is an aliphatic hydrocarbon resin commercially available under the trade designation ESCOREZ 1300 from ExxonMobil Chemical Co. (Houston, Tex.).

The term "WTPLUS" refers to a tackifier that is an aromatically modified hydrocarbon resin commercially available under the trade designation WINGTACK PLUS from Cray Valley (Exton Pa.).

Test strips were prepared as described in Example 5 and evaluated for shear strength and peel force. Test results are shown in Table 3.

TABLE 3

Blended compositions and adhesive properties

| Ex | Viscoelastic Material/ Grams | Oxazolinyl-terminated Polymer Example/Grams | Other Resins Type/Grams | Shear Strength (Minutes) | Peel Force (N/dm) |
|---|---|---|---|---|---|
| 13 | P1/24.5 | EX1/1.76 | M6240/0.5 | +10,000 | 21 |
| 14 | P1/24.5 | EX1/1.76 | P1205/0.5 | +10,000 | 13 |
| 15 | P1/23.5 | EX1/1.69 | M6240/1.25 | +10,000 | 8 |
| 16 | P2/23.5 | EX1/1.69 | P1205/1.25 | +10,000 | 12 |
| 17 | P1/23.5 | EX2/1.69 | P1205/1.25 | 4,260 | 38 |
| 18 | P1/22 | EX2/1.58 | R6108/3 | +10,000 | 19 |
| 19 | P1/22 | EX2/1.58 | ES 5400/3 | +10,000 | 17 |
| 20 | P1/22 | EX2/1.58 | WTPLUS/3 | +10,000 | 24 |
| 21 | P1/22 | EX2/1.58 | ES 1310/3 | +10,000 | 20 |
| 22 | P1/23 | EX2/1.0 | ES 1310/3 | +10,000 | 22 |
| 23 | P1/26 | EX1/1.2 | N63T/(0.5) | 4,500 | 14 |
| 24 | P1/26 | EX1/1.2 | N12/0.5 | +10,000 | 22 |

Comparative Examples C1-C3

Adhesive Properties of Viscoelastic Materials

Test strips were prepared using the procedure described in Example 5 using only the viscoelastic materials P1-P3. Test results are shown in Table 4.

TABLE 4

Adhesive properties of viscoelastic materials

| Ex | Viscoelastic Material/Grams | Shear Strength Minutes | Peel Force N/dm |
|----|----|----|----|
| C1 | P1/26 | 120 | 53 |
| C2 | P2/26 | 50 | 64 |
| C3 | P3/26 | 5 | 74 |

Comparative Examples C4-C7

Blends of Viscoelastic Material and Carboxyl-Terminated Polymer

Tapes were prepared and tested according to the procedure described in Example 5 using adhesive P1 and the carboxyl-terminated polymers prepared as intermediates in the preparation of the oxazolinyl-terminated polymers in Examples 1-3. The carboxyl-terminated polymers are referred to as EX1-acid, EX2-acid, and EX3-acid. The amount of each component and the adhesive properties are shown in Table 5.

TABLE 5

Viscoelastic material/carboxyl-terminated polymer blends and adhesive characteristics thereof

| Ex | Viscoelastic Material/Grams | Acid Polymer Example/Grams | Shear Strength Minutes | Peel Force N/100 mm |
|----|----|----|----|----|
| C4 | P1/26 | EX1-acid/2.2 | 310 | 54 |
| C5 | P1/26 | EX2-acid/2.2 | 170 | 49 |
| C7 | P1/26 | EX3-acid/2.2 | 350 | 46 |

What is claimed is:

1. A compound of Formula (I)

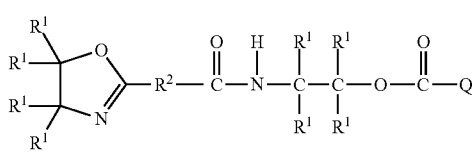

(I)

wherein
each $R^1$ is independently hydrogen, alkyl, aryl, or aralkyl;
$R^2$ group is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof;
$R^3$ is hydrogen or an alkyl; and
Q is a polymeric group that is a polymerized product of a first monomer composition that includes at least one ethylenically unsaturated monomer, wherein the monomer composition comprises a vinyl aryl monomer, vinyl heterocyclic monomer, or a combination thereof and wherein Q does not contain a carboxyl group.

2. The compound of claim 1, wherein the group Q has a weight average molecular weight equal to at least 5000 grams/mole.

3. The compound of claim 1, wherein the compound has a glass transition temperature equal to at least 20° C.

4. The compound of claim 1, wherein $R^2$ is phenylene.

5. The compound of claim 1, wherein $R^2$ is an alkylene or a single bond.

6. The compound of claim 1, wherein $R^2$ is a heteroalkylene.

7. A reaction mixture comprising:
a) a first compound of Formula (I)

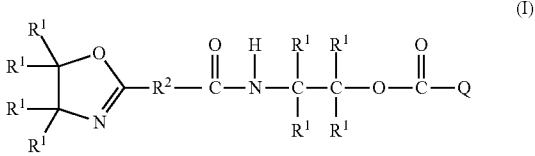

(I)

wherein
each $R^1$ is independently hydrogen, alkyl, aryl, or aralkyl;
$R^2$ is a single bond or a divalent group comprising an alkylene, heteroalkylene, arylene, heteroarylene, or a combination thereof, wherein the divalent group optionally further comprises an oxy, carbonyl, carbonyloxy, carbonylimino, —$NR^3$—, or a combination thereof;
$R^3$ is hydrogen or an alkyl; and
Q is a polymeric group comprising a polymerized product of a first monomer composition comprising at least one ethylenically unsaturated monomer, wherein the monomer composition comprises a vinyl aryl monomer, vinyl heterocyclic monomer, or a combination thereof and wherein Q does not contain a carboxyl group; and
b) a second compound having at least one acidic group, wherein the second compound is a polymerized product of a second monomer composition comprising (a) (meth)acrylic acid and (b) at least one (meth)acrylate ester.

8. The reaction mixture of claim 7, wherein the second compound is a polymeric material having multiple acidic groups.

9. The reaction mixture of claim 7, wherein the second compound is a second polymeric material having multiple carboxyl groups.

10. A grafted copolymer comprising a product of a reaction mixture comprising:
a) a first compound of Formula (I)

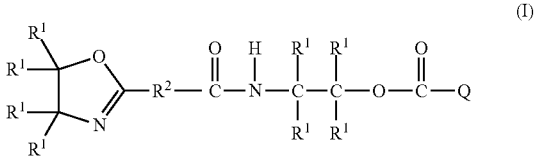

(I)

wherein
each $R^1$ is independently hydrogen, alkyl, aryl, or aralkyl;
$R^2$ is a single bond or a divalent group comprising an alkylene, heteroalkylene, arylene, heteroarylene, or a combination thereof, wherein the divalent group optionally further comprises an oxy, carbonyl, carbonyloxy, carbonylimino, —NR$^3$—, or a combination thereof;

$R^3$ is hydrogen or an alkyl; and

Q is a first polymeric group comprising a polymerized product of a first monomer composition comprising at least one ethylenically unsaturated monomer, wherein the monomer composition comprises a vinyl aryl monomer, vinyl heterocyclic monomer, or a combination thereof and wherein Q does not contain a carboxyl group; and b) a second polymeric material having at least one acidic group, wherein the second polymeric material is a viscoelastic material prepared from a second monomer composition comprising (a) (meth)acrylic acid and (b) at least one (meth)acrylate ester.

11. The grafted copolymer of claim 10, wherein the grafted copolymer has a plurality of pendant groups of formula —(CO)OC(R$^1$)$_2$C(R$^1$)$_2$NH—(CO)—R$^2$—(CO)—NH—C(R$^1$)$_2$C(R$^1$)$_2$—O(CO)-Q.

12. The grafted copolymer of claim 10, wherein the group Q is phase separated from the second polymeric material of the grafted copolymer.

13. A composition comprising:
a) a grafted copolymer comprising a product of a reaction mixture comprising
1) a first compound of Formula (I)

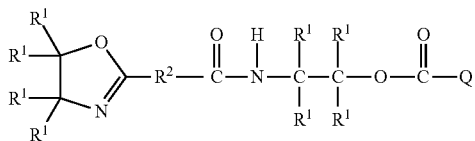

wherein
each $R^1$ is independently hydrogen, alkyl, aryl, or aralkyl;
$R^2$ is a single bond or a divalent group comprising an alkylene, heteroalkylene, arylene, heteroarylene, or a combination thereof, wherein the divalent group optionally further comprises an oxy, carbonyl, carbonyloxy, carbonylimino, —NR$^3$—, or a combination thereof;

$R^3$ is hydrogen or an alkyl; and

Q is a first polymeric group comprising a polymerized product of a first monomer composition comprising at least one ethylenically unsaturated monomer, wherein the monomer composition comprises a vinyl aryl monomer, vinyl heterocyclic monomer, or a combination thereof and wherein Q does not contain a carboxyl group; and 2) a second polymeric material having at least one acidic group, wherein the second polymeric material is a polymerized product of a second monomer composition comprising (a) (meth)acrylic acid and (b) at least one (meth)acrylate ester; and b) a polyamide blended with the grafted copolymer, wherein the polyamide is selected 1) to have a melting temperature no greater than 200° C., 2) to be at least partially soluble in the composition at blending temperature, or 3) both 1) and 2).

14. The composition of claim 13, wherein the composition is hot melt processable.

15. The composition of claim 13, wherein polyamide is present in an amount in a range of 0.5 to 20 weight percent based on a total weight of the composition.

16. The compound of claim 1, wherein Q is polystyrene, random poly(styrene-co-vinyl pryridine), or diblock poly(styrene-co-vinyl pyridine).

17. The reaction mixture of claim 7, wherein Q is polystyrene, random poly(styrene-co-vinyl pryridine), or diblock poly(styrene-co-vinyl pyridine).

18. The grafted copolymer of claim 10, wherein Q is polystyrene, random poly(styrene-co-vinyl pryridine), or diblock poly(styrene-co-vinyl pyridine).

19. The composition of claim 13, wherein Q is polystyrene, random poly(styrene-co-vinyl pryridine), or diblock poly(styrene-co-vinyl pyridine).

20. The grafted copolymer of claim 10, wherein the reaction mixture comprises 0.5 to 20 weight percent of the first compound and 80 to 99.5 weight percent of the second compound based on the total weight of polymeric material.

\* \* \* \* \*

UNITED STATES PATENT AND TRADEMARK OFFICE
CERTIFICATE OF CORRECTION

PATENT NO. : 8,816,004 B2
APPLICATION NO. : 13/885195
DATED : August 26, 2014
INVENTOR(S) : Jason Clapper et al.

It is certified that error appears in the above-identified patent and that said Letters Patent is hereby corrected as shown below:

In the Specification

Column 3
Line 62, delete "bicylic," and insert -- bicyclic, --, therefor.

Column 6
Line 61, delete "then" and insert -- than --, therefor.

Column 9
Line 32, delete "sytrenes" and insert -- styrenes --, therefor.

Column 15
Lines 29-30, delete "2-tridencanol," and insert -- 2-tridecanol, --, therefor.

Line 58, delete "then" and insert -- than --, therefor.

Column 16
Line 17, delete "photoinitator," and insert -- photoinitiator, --, therefor.

Line 18, delete "photoinitator" and insert -- photoinitiator --, therefor.

Line 44, delete "naphthanate)." and insert -- naphthenate). --, therefor.

Column 17
Line 32, delete "then" and insert -- than --, therefor.

Column 20
Line 7, delete "dimethylstytrene," and insert -- dimethylstyrene, --, therefor.

Signed and Sealed this
Fourteenth Day of April, 2015

Michelle K. Lee
*Director of the United States Patent and Trademark Office*

Column 22
Line 12, delete "adsorbant" and insert -- adsorbent --, therefor.

Line 15, delete "wetability," and insert -- wettability, --, therefor.

Column 23
Line 27, delete "diamines" and insert -- diamines. --, therefor.

Column 26
Lines 10-11, delete "polyfluorpolyether" and insert -- polyfluoropolyether --, therefor.

Column 38
Line 32 (Approx.), delete "(Kinsgport" and insert -- (Kingsport --, therefor.

In the Claims

Column 42
Line 27, in Claim 16, delete "pryridine)," and insert -- pyridine), --, therefor.

Line 30, in Claim 17, delete "pryridine)," and insert -- pyridine), --, therefor.

Line 33, in Claim 18, delete "pryridine)," and insert -- pyridine), --, therefor.

Line 36, in Claim 19, delete "pryridine)," and insert -- pyridine), --, therefor.